(12) United States Patent
Minamikawa

(10) Patent No.: US 10,649,120 B2
(45) Date of Patent: May 12, 2020

(54) OPTICAL ELEMENT, ARTICLE, AND METHOD OF PRODUCING OPTICAL ELEMENT

(71) Applicant: TOPPAN PRINTING CO., LTD., Tokyo (JP)

(72) Inventor: Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 161 days.

(21) Appl. No.: 15/650,384

(22) Filed: Jul. 14, 2017

(65) Prior Publication Data

US 2017/0315277 A1    Nov. 2, 2017

Related U.S. Application Data

(63) Continuation of application No. PCT/JP2016/051012, filed on Jan. 14, 2016.

(30) Foreign Application Priority Data

Jan. 15, 2015    (JP) .................................. 2015-006026

(51) Int. Cl.
*G03H 1/02*    (2006.01)
*G02B 5/18*    (2006.01)
(Continued)

(52) U.S. Cl.
CPC ......... *G02B 5/1876* (2013.01); *B42D 25/324* (2014.10); *B42D 25/328* (2014.10); *B42D 25/373* (2014.10); *G02B 5/008* (2013.01); *G02B 5/085* (2013.01); *G02B 5/18* (2013.01);

*G03H 1/02* (2013.01); *G01N 21/898* (2013.01); *G01N 2021/8438* (2013.01); *G01N 2021/869* (2013.01)

(58) Field of Classification Search
CPC ................................. G02B 5/008; B42D 25/47
USPC ............................. 359/2, 572, 576; 156/209
See application file for complete search history.

(56) References Cited

U.S. PATENT DOCUMENTS

5,549,774 A  *   8/1996  Miekka .................... B41M 3/14
                                                    156/209
7,145,723 B2 *  12/2006  Tompkin ................ B42D 25/29
                                                    359/576

(Continued)

FOREIGN PATENT DOCUMENTS

EP    2 042 343 A1    4/2009
JP    2524092 Y2     1/1997

(Continued)

OTHER PUBLICATIONS

International Search Report for International Patent Application No. PCT/JP2016/051012 dated Apr. 12, 2016.

(Continued)

*Primary Examiner* — Audrey Y Chang
(74) *Attorney, Agent, or Firm* — Foley & Lardner LLP

(57) ABSTRACT

An optical element includes a conversion layer and a metal piece layer. The conversion layer is provided with a light-incidence surface including an uneven surface, the conversion layer being configured to receive light incident on the uneven surface and output the light from the uneven surface as light in a different state than the incident light. The metal piece layer is configured by a plurality of metal pieces to cover at least part of the uneven surface.

17 Claims, 9 Drawing Sheets

(51) Int. Cl.
*B42D 25/328* (2014.01)
*B42D 25/324* (2014.01)
*B42D 25/373* (2014.01)
*G02B 5/00* (2006.01)
*G02B 5/08* (2006.01)
*G01N 21/898* (2006.01)
*G01N 21/84* (2006.01)
*G01N 21/86* (2006.01)

(56) References Cited

U.S. PATENT DOCUMENTS

| | | | | |
|---|---|---|---|---|
| 7,907,339 | B2* | 3/2011 | Tompkin | B42D 25/00 |
| | | | | 359/569 |
| 2007/0020530 | A1 | 1/2007 | Zientek et al. | |
| 2009/0141355 | A1 | 6/2009 | Thomas et al. | |
| 2013/0182300 | A1* | 7/2013 | Muller | B42D 25/47 |
| | | | | 359/2 |
| 2015/0298482 | A1* | 10/2015 | Walter | G02B 5/008 |
| | | | | 359/572 |
| 2018/0201043 | A1 | 7/2018 | Walter et al. | |

FOREIGN PATENT DOCUMENTS

| | | |
|---|---|---|
| JP | 2003-255115 A | 9/2003 |
| JP | 2007-241188 A | 9/2007 |
| JP | 4088884 B2 | 5/2008 |
| JP | 4194073 B2 | 12/2008 |
| JP | 2009-069344 A | 4/2009 |
| WO | WO-01/00418 A1 | 1/2001 |
| WO | WO-2013/090983 A1 | 6/2013 |
| WO | WO-2014/072358 A1 | 5/2014 |
| WO | WO-2014/077329 A1 | 5/2014 |
| WO | WO-2014/199832 A1 | 12/2014 |

OTHER PUBLICATIONS

Extended European Search Report dated Sep. 7, 2018 in corresponding application No. 16737431.3.

* cited by examiner

OPTICAL ELEMENT, ARTICLE, AND METHOD OF PRODUCING OPTICAL ELEMENT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/051012, filed on Jan. 14, 2016, which is based upon and claims the benefit of priority of Japanese Patent Application No. 2015-006026, filed on Jan. 15, 2015, the entireties of which are hereby incorporated by reference.

TECHNICAL FIELD

The present invention relates to an optical element, an article provided with the optical element, and a method of producing the optical element.

BACKGROUND

Counterfeiting of negotiable instruments, certificates, brand name products, and personal authentication media should desirably involve some difficulty. Therefore, it is often the case that such articles are provided with optical elements having a superior effect of preventing counterfeiting of articles.

Such optical elements are often provided with fine structures such as diffraction gratings, holograms, and lens arrays. Analysis of such fine structures is difficult. With this analysis difficulty, coupled with the necessity of using expensive equipment, such as an electron beam writer or the like, when being produced, such optical elements with fine structures exert a superior effect of preventing counterfeiting of articles.

The abovementioned optical element is provided with, for example, a formation layer for forming a diffraction structure serving as a diffraction grating or a hologram, and a metal layer formed on an uneven surface of the formation layer. The metal layer has a predetermined pattern and is positioned in a portion of the uneven surface. The metal layer is formed by, for example, forming a metal film by sputtering to array metal atoms substantially uniformly on the entirety of the uneven surface, and using photolithography to process the metal film into a predetermined shape (e.g., refer to PTL 1).

PRIOR ART LITERATURE

Citation List

Patent Literature

PTL 1: JP 2003-255115 A

SUMMARY OF THE INVENTION

Technical Problem

Metal layers of optical elements are generally, as stated above, formed from part of a metal film in which the metal atoms are substantially uniformly arrayed. To further increase the effect of preventing counterfeiting of articles, it has been sought that the optical elements should have a degree of freedom in the appearance expressed by the metal layer, i.e., different appearance than that of the metal layer in which the metal atoms are simply substantially uniformly arrayed.

These matters are not only sought for the optical elements used for the purpose of preventing counterfeiting of articles as mentioned above, but also for the optical elements used for the purpose of decorating articles, and optical elements used for the purpose of increasing the aesthetic appearance of articles.

It is an object of the present invention to provide an optical element which expresses a different appearance than the appearance expressed by the surface of the metal film in which the metal atoms are substantially uniformly arrayed, an article, and a method of producing the optical element.

Solution to Problem

An optical element for solving the abovementioned problem includes a conversion layer and a metal piece layer. The conversion layer is provided with a light-incidence surface including an uneven surface, and is configured to receive light that is incident on the uneven surface and output the light from the uneven surface as light in a different state than the incident light. The metal piece layer is configured by a plurality of metal pieces to cover at least part of the uneven surface.

An article for solving the abovementioned problem is an article provided with an optical element, and the optical element is the abovementioned optical element.

A method of producing an optical element for solving the aforementioned problem includes: forming a conversion layer provided with a light-incidence surface that includes an uneven surface and a flat surface flatter than the uneven surface, the light-incidence surface receiving light incident on the uneven surface and outputting the light from the uneven surface as light in a different state than the incident light; forming a metal piece layer configured by a plurality of metal pieces in at least part of the uneven surface and in at least part of the flat surface; and transferring at least part of the metal piece layer formed on the flat surface to the uneven surface, by applying a force to the metal piece layer formed on the flat surface, the force being applied in a shearing direction relative to the metal piece layer.

According to the abovementioned aspect, the layer covering the uneven surface is a metal piece layer formed of a plurality of metal pieces. Thus, the optical element can express an appearance different from that of the configuration of a metal film simply formed of substantially uniformly arrayed metal atoms.

In the abovementioned optical element, the light-incidence surface may further include a flat surface which is flatter than the uneven surface; the uneven surface may include a plurality of convexities; and at least part of the plurality of convexities may be located at a lower level than the flat surface in a thickness direction of the conversion layer.

According to the abovementioned aspect, when a member different from the optical element contacts the flat surface, the member hardly contacts the convexities located at a lower level than the flat surface, among the plurality of convexities. Therefore, the metal piece layer positioned at the convexities which are located at a lower level than the flat surface is prevented from being peeled off from the convexities due to the contact of the member with the optical element.

In the abovementioned optical element, the uneven surface may include a portion having a rectangular wave-shaped cross section in the thickness direction of the conversion layer.

According to the abovementioned aspect, in each concavity, a bottom portion which is the most recessed portion in the thickness direction of the conversion layer is formed of a flat surface, and a corner portion formed between the bottom portion and a side portion connected to the bottom portion is substantially at a right angle. Therefore, the metal piece layer easily adheres to the bottom portion of each concavity, and the metal piece layer adhered to the corner portion is resistant to being peeled off from the concavity, compared to the configuration in which the corner portion has a curvature.

In the abovementioned optical element, the uneven surface may include a plurality of concavities; each of the plurality of concavities may have a bottom portion including a most recessed portion in the thickness direction of the conversion layer; and the plurality of concavities may each be configured by two arc surfaces which are connected to each other in the bottom portion and face each other, the two arc surfaces each having a curvature of forming an outward projection in the conversion layer from the uneven surface.

According to the abovementioned embodiment, each concavity is configured by the two arc surfaces each having a curvature of forming an outward projection in the conversion layer from the uneven surface. Thus, in each concavity, the space surrounded by surfaces of each concavity near the top portion is relatively large, and the space surrounded by surfaces of the concavity near the bottom portion is relatively small. Therefore, a member positioned on the outside of the optical element hardly enters the concavity. As a result, the metal piece layer positioned on the bottom portion of the concavity is resistant to being peeled off from the concavity.

In the abovementioned optical element, the uneven surface may include a plurality of concavities; the plurality of concavities may each have a bottom portion including a most recessed portion in the thickness direction of the conversion layer, and a top portion including a most protruded portion in the thickness direction of the conversion layer; and the top portion may have a curvature larger than a curvature in the bottom portion, in at least part of the plurality of concavities.

According to the abovementioned aspect, since the top portion has a curvature greater than the curvature of the bottom portion, the space surrounded by surfaces of each concavity near the top portion is relatively large, and the space surrounded by surfaces of the concavity near the bottom portion is relatively small. Therefore, a member positioned on the outside of the optical element hardly enters the concavity. As a result, the metal piece layer positioned on the bottom portion of the concavity is resistant to being peeled off from the concavity.

In the abovementioned optical element, the uneven surface may include a plurality of convexities; the plurality of convexities may each have a top portion including a most protruded portion in the thickness direction of the conversion layer; the plurality of convexities may each be configured by two reversely oriented arc surfaces connected to each other in the top portion, the two arc surfaces each having a curvature of forming an inward projection in the conversion layer from the uneven surface.

According to the abovementioned aspect, since each convexity is configured by two arc surfaces each having a curvature of forming an inward projection in the conversion layer from the uneven surface, adjacent convexities have a larger distance therebetween toward the bottom from the top portion. Therefore, the area allowing for easy adhesion of the metal piece layer is large in the uneven surface of the optical element.

In the abovementioned optical element, the uneven surface may include a plurality of concavities; the plurality of concavities may each have a bottom portion including a most recessed portion in the thickness direction of the conversion layer, and a top portion including a most protruded portion in the thickness direction of the conversion layer; and the bottom portion may have a curvature greater than a curvature in the top portion, in at least part of the plurality of concavities.

According to the abovementioned aspect, since the curvature in the bottom portion is greater than the curvature in the top portion, the bottom portion of each concavity is broad. Therefore, in the uneven surface of the optical element, the area of the portion where the metal piece layer easily adheres is large.

In the abovementioned optical element, the uneven surface may include a portion having a sinusoidal wave-shaped cross section in the thickness direction of the conversion layer.

For example, the conversion layer is formed by pressing an original plate having a pattern for forming the uneven surface and a flat surface against the resin layer prior to curing, and curing the resin layer, keeping the original plate pressed against the resin. In this regard, according to the abovementioned aspect, the portion having a sinusoidal wave-shaped cross section in the thickness direction of the conversion layer has a smoothly changing shape. Thus, the shape of the original plate is easily transferred to the resin layer with good accuracy.

In the abovementioned optical element, the uneven surface may include a plurality of concavities and a plurality of convexities; the concavities and the convexities may be alternately and consecutively arrayed, and the uneven surface may have a height difference in a range of 0.1 μm or more to 0.5 μm or less in the thickness direction of the conversion layer; the concavities may each have a bottom portion which is a most recessed portion in the thickness direction of the conversion layer; two of the bottom portions have a distance therebetween in a range of 0.2 μm or more to 5 μm or less, the two of the bottom portions being adjacent to each other in an array direction of the concavities and the convexities; the metal pieces may each have a form of a particle; the metal pieces adjacent to each other may have a distance therebetween in a range of 0.01 μm or more to 0.1 μm or less; and the metal pieces may each have a diameter in a range of 0.02 μm or more to 0.5 μm or less.

According to the abovementioned aspect, the metal pieces easily adhere to the concavities of the conversion layer. Further, even if a member positioned on the outside of the optical element touches the optical element, the metal pieces adhered to the concavities are resistant to being peeled off.

Advantageous Effects of the Invention

The present invention can express an appearance that is different than the appearance expressed by the surface of a metal film in which the metal atoms are substantially uniformly arrayed.

DESCRIPTION OF REPRESENTATIVE EMBODIMENTS

An optical element, an article, and a method of producing the optical element according to an embodiment will be described with reference to FIGS. 1 to 12. The following description sequentially addresses the configuration of the optical element, the method of producing the optical element, and the configuration of the article. It will be understood that the invention is not necessarily limited to the embodiments described below and depicted in the FIGS. The descriptions below and the FIGS. are representative of the invention.

[Configuration of Optical Element]

Figure 1:
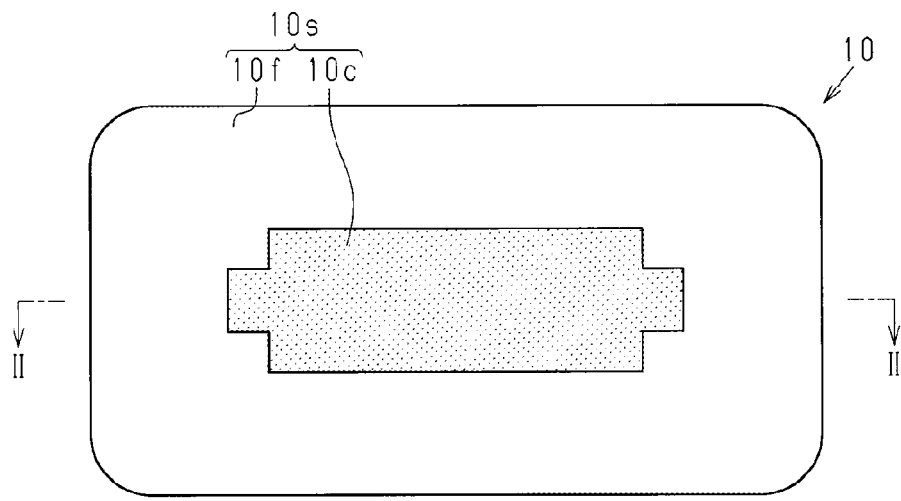
FIG. 1 is a plan view illustrating a structure seen from the incident surface side according to an embodiment of an optical element of the present invention.

As shown in FIG. 1, an optical element 10 has a substantially rectangular shape and has a surface serving as an incident surface 10s. The incident surface 10s is an example of a light-incidence surface, and is the front surface observed by an observer. The incident surface 10s includes an uneven surface 10c that outputs light incident on the incident surface 10s as light of a different state than the incident light, and a flat surface 10f flatter than the uneven surface 10c, i.e., a surface with high smoothness or with low roughness. In the incident surface 10s, the flat surface 10f surrounds the uneven surface 10c throughout the perimeter thereof.

The flat surface 10f may surround part of the uneven surface 10c, or the flat surface 10f and the uneven surface 10c may be arranged in one direction in the incident surface 10s. The incident surface 10s may include a plurality of uneven surfaces 10c and one flat surface 10f, or may include one uneven surface 10c and a plurality of flat surfaces 10f. Alternatively, the incident surface 10s may include a plurality of uneven surfaces 10c and a plurality of flat surfaces 10f.

Figure 2:
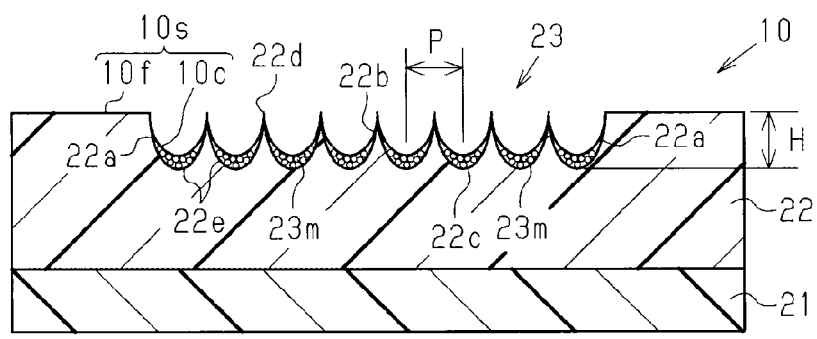
FIG. 2 is a cross-sectional view illustrating structure of the optical element taken along the line II-II of FIG. 1.

As shown in FIG. 2, the optical element 10 includes a support layer 21 and a conversion layer 22. The conversion layer 22 is positioned on a surface of the support layer 21. In the conversion layer 22, the surface which is opposite to the surface contacting the support layer 21 is the incident surface 10s of the optical element 10, and is provided with the flat surface 10f and the uneven surface 10c in which a plurality of concavities 22a are formed. The optical element 10 further includes a metal piece layer 23 formed of a plurality of metal pieces 23m to cover the uneven surface 10c of the incident surface 10s.

The support layer 21 is preferably a film. The support layer 21 may be a plastic film made of a resin such as polyethylene terephthalate (PET), polyethylene naphthalate (PEN), and polypropylene (PP). It is preferred that the material forming the support layer 21 is a material generating less heat in the support layer 21 when forming the conversion layer 22, and causing less deformation and modification due to a solvent contacting the support layer 21. The support layer 21 may be paper, synthetic paper, plastic multiple-layer paper, resin-impregnated paper, or the like.

The thickness of the support layer 21 in the layered direction of the support layer 21 and the conversion layer 22 is preferably in the range of 4 μm or more to 100 μm or less, and more preferably, 12 μm or more to 50 μm or less. When the thickness of the support layer 21 is 4 μm or more, the physical strength of the support layer 21 becomes sufficiently high to the extent that the handling of the support layers 21 is easy.

The front surface of the optical element 10 may be a surface of the support layer 21 on the side opposite to the surface contacting the conversion layer 22. In such a configuration, by setting the thickness of the support layer 21 to 100 μm or less, optical loss of visible light due to the support layer 21 is minimized. Therefore, the light outputted from the flat surface 10f and the uneven surface 10c constituting the incident surface 10s is easily visually recognized via the support layer 21.

The metal piece layer 23 is formed of a plurality of metal pieces 23m to cover the entirety of the uneven surface 10c. The metal piece layer 23 enhances the effect of converting the incident light, such as the effect of diffracting the incident light, exerted by the uneven surface 10c. Each of the plurality of metal pieces 23m forming the metal piece layer 23 is a grain, such as a particle, a film piece, or the like, formed of uniformly placed metal elements.

In the metal piece layer 23, the plurality of metal pieces 23m may be arranged irregularly, or may be arranged regularly. Alternatively, portions in which a plurality of metal pieces 23m are irregularly arranged and portions in which they are regularly arranged may be mixed together in the metal piece layer 23.

In the plurality of metal pieces 23m, the distance between the metal pieces 23m adjacent to each other is a metal piece pitch. The metal piece pitch falls within the range of 0.01 μm or more to 0.1 μm or less. An average of metal piece pitches is obtained by summing up a plurality of metal piece pitches and dividing the sum by the number of the metal piece pitches. The average metal piece pitch is preferably in the range of 0.01 μm or more to 0.1 μm or less. Of a plurality of metal piece pitches, the one having a highest frequency, i.e. a mode, is preferably in the range of 0.01 μm or more to 0.1 μm or less. The minimum metal piece pitch is preferably 0.01 μm, and the maximum is preferably 0.1 μm.

The metal piece layer 23 may include a portion in which the average of the metal piece pitches is represented by a first value and a portion in which the average of the metal piece pitches is represented by a second value that is different from the first value. Alternatively, the metal piece layer 23 may include a portion in which the mode of the metal piece pitches is represented by a third value and a portion in which the mode of the metal piece pitches is represented by a fourth value that is different from the third value. The metal piece layer 23 may include three or more portions that are different from each other in the average of the metal piece pitches, and three or more portions that are different from each other in the mode of the metal piece pitches.

In the metal piece layer 23, there are gaps, large or small, formed between two metal pieces 23m adjacent to each other. The metal piece layer 23 is not a layer in which a plurality of metal elements are uniformly arrayed across the entirety of the layer, but is a layer in which a plurality of grains each configured by arrayed metal elements are placed with a gap, large or small, therebetween.

Thus, the metal piece layer 23 has different optical effects than the metal film in which the metal atoms are substantially uniformly arrayed. Therefore, unlike the appearances expressed by the surfaces of the metal films in which the metal atoms are substantially uniformly arrayed, the appearances of the optical elements provided with the metal piece layer 23 are individually differently expressed.

Each of the plurality of metal pieces 23m has, for example, the form of a particle. The shape of the metal piece 23m does not have to have the form of a particle but may be, for example, a spherical shape, a plate shape, a pillar shape, or a conical shape. The plurality of metal pieces 23m may include a combination of two or more types of metal pieces 23m having different shapes than each other.

When each metal piece 23m has the form of a particle, the diameter of the metal piece 23m falls, for example, in the range of 0.02 μm or more to 0.5 μm or less. An average diameter of the metal piece 23m is obtained by summing up the diameters of a plurality of metal pieces 23m and dividing the sum by the number of metal pieces 23m, and the average is preferably in the range of 0.02 μm or more to 0.5 μm or less. Of the diameters of the metal piece 23m, the one having a highest frequency, i.e. a mode, is preferably in the range of 0.02 μm or more to 0.5 μm or less. Of the diameters of a plurality of metal pieces 23m, the minimum diameter is preferably 0.02 μm, and the maximum diameter is preferably 0.5 μm.

The metal piece layer 23 may include a portion in which an average diameter of the metal pieces 23m is represented by a first value and a portion in which an average particle size is represented by a second value that is different from the first value. Alternatively, the metal piece layer 23 may include a portion in which a mode of the particle sizes is represented by a third value and a portion in which a mode of the particle sizes is represented by a fourth value that is different from the third value. The metal piece layer 23 may include three or more portions different in the average particle size from each other, and three or more portions different in the mode of particle size from each other.

In each of the plurality of concavities 22a constituting the uneven surface 10c, the thickness of the metal piece layer 23 is made smaller toward the opening of the concavity 22a, and made larger toward the most recessed portion, i.e., the bottom of the concavity 22a, in the thickness direction of the conversion layer 22. It should be noted that the thickness of the metal piece 23m may be made larger toward the opening of each concavity 22a, and may be made smaller toward the bottom of the concavity 22a.

In the thickness of the metal piece layer 23, each of the concavities 22a constituting the uneven surface 10c may have a predetermined thickness distribution. Specifically, each concavity 22a may have an unbalanced thickness symmetric with respect to the bottom of the concavity 22a, or may have an unbalanced thickness asymmetric with respect to the bottom of the concavity 22a. In the thickness of the metal piece layer 23, all the plurality of the concavities 22a constituting the uneven surface 10c may have the same thickness distribution, or may have a predetermined thickness distribution for each of the plurality of concavities 22a.

Alternatively, the thickness of the metal piece layer 23 may be increased in the direction in which the concavities 22a constituting the uneven surface 10c are arrayed. The thickness of the metal piece layer 23 formed on each concavity 22a may be made larger toward the flat surface 10f.

The thickness of the metal piece layer 23 is preferably, for example, in the range of 1 nm or more to 1000 nm or less, and more preferably, 1 nm or more to 50 nm or less.

The plurality of metal pieces 23m may include first metal pieces made of a first material and second metal pieces made of a material different than the first material. The shape of the first metal piece may be different from or the same as the shape of the second metal piece. The plurality of metal pieces 23m may include three or more types of metal pieces 23m in which the forming materials are different from each other. In such a configuration, all the three or more types of metal pieces 23m may have the same shape, or the shape of the metal pieces 23m may be different on a type basis, or some types of the metal pieces 23m may have the same shape, and some other types of the metal pieces 23m may have another shape that is different from the first types of the metal pieces 23m.

The material forming the metal piece 23m may be a single metal including, such as aluminum, tin, zinc, chromium, nickel, copper, or gold, or may be an alloy, such as brass that is an alloy of copper and zinc. Alternatively, the material forming the metal piece 23m may be a mixture containing two or more metal elements selected from the group consisting of the aforementioned plurality of metal elements, or may be an alloy thereof.

These metals used singly or in an alloyed form are preferable from the viewpoint that a particle film is considered to be formed by a plurality of metal pieces 23m in the form of a particle. Of these metals used singly or in an alloyed form, tin or an alloy containing tin is specifically preferable from the viewpoint that a particle film configured by the metal pieces 23m in the form of a particle is easily formed compared to other metals used singly or in an alloyed form.

The conversion layer 22 has an uneven surface 10c for outputting light, which is incident on the conversion layer 22, as light different from when incident upon the conversion layer 22.

The material forming the conversion layer 22 is, for example, a thermoplastic resin or a thermosetting resin. Of these resins, the thermoplastic resin includes, for example, an acrylic resin, an epoxy resin, a cellulose resin, or a vinyl resin, and the thermosetting resin includes a urethane resin, a melamine resin, an epoxy resin, or a phenol resin.

When forming the conversion layer 22 using a photopolymer process, the material forming the conversion layer 22 may be a monomer, an oligomer, or a polymer having an ethylenically unsaturated bond or an ethylenically unsaturated group. Examples of the monomer include 1,6-hexane diol, neopentylglycol diacrylate, trimethylolpropane triacrylate, pentaerythritol triacrylate, pentaerythritol tetraacrylate, dipentaerythritol pentaacrylate, and dipentaerythritol hexaacrylate. Examples of the oligomer include epoxy acrylate, urethane acrylate, and polyester acrylate. Examples of the polymer include a urethane-modified acrylic resin, and an epoxy-modified acrylic resin.

The material forming the conversion layer 22 may be an ionizing radiation-curable resin, examples of which may include an oxetane skeleton-containing compound, a vinyl ether, a monomer having an epoxy group, an oligomer, and a polymer. A photopolymerization initiator may be added to these ionizing radiation-curable resins. For the photopolymerization initiator, any of an optical radical polymerization initiator, an optical cationic polymerization initiator, and a hybrid polymerization initiator, which is a combination of an optical radical polymerization initiator and an optical cationic polymerization initiator, can be selected according to the ionizing radiation-curable resin to which the photopolymerization initiator is added.

Examples of the optical radical polymerization initiator include benzoin, a benzoin-based compound, such as benzoin methyl ether or benzoin ethyl ether, anthraquinone, an anthraquinone-based compound such as methyl anthraquinone, a phenyl-ketone-based compound, such as acetophenone, diethoxy acetophenone, benzophenone, hydroxy acetophenone, 1-hydroxy cyclohexyl phenyl ketone, α-amino acetophenone, or 2-methyl-1-(4-methylthiophenyl)-2-morpholino-propane-1-on, benzyl dimethyl ketal, thioxanthone, acyl phosphine oxide, and Michler's ketone.

The optical cationic polymerization initiator includes an aromatic diazonium salt, an aromatic iodonium salt, an aromatic sulfonium salt, an aromatic phosphonium salt, or a mixed ligand metal salt.

Examples of a hybrid polymerization initiator that uses both an optical radical polymerization initiator and an optical cationic polymerization initiator include mixtures of an optical radical polymerization initiator and an optical cationic polymerization initiator mentioned above. The hybrid polymerization initiator may be a polymerization initiator which can solely initiate both optical radical polymerization and optical cationic polymerization, and thus may be, for example, an aromatic iodonium salt or an aromatic sulfonium salt.

When the entire amount of the ionizing radiation-curable resin and the photopolymerization initiator is 100 mass %, the mass of the photopolymerization initiator is preferably in the range of 0.1 mass % or more to 15 mass % or less. A sensitizing dye may be mixed in the ionizing radiation-curable resin, together with the photopolymerization initiator. The ionizing radiation-curable resin may have an addition of a dye, a pigment, or various additives, such as a polymerization inhibitor, a leveling agent, an antifoaming agent, an anti-sagging agent, an adhesion improvement agent, a coated surface modifier, and plasticizer, or a nitrogen-containing compound. For example, the ionizing radiation-curable resin may be admixed with a crosslinking agent, such as an epoxy resin. The ionizing radiation-curable resin may be admixed with a resin, such as a thermoplastic resin or a thermosetting resin mentioned above, which is nonreactive with a photopolymerization reaction, for the purpose of improving formability of the conversion layer 22.

The ionizing radiation-curable resin can also be used being admixed with monomers, oligomers, polymers, or the like having an ethylenically unsaturated bond or an ethylenically unsaturated group.

A reactive group may be provided in advance to the monomers, oligomers, polymers, or the like mixed in the ionizing radiation-curable resins. Being provided with a reactive group, the monomers, oligomers, polymers, or the like are crosslinked to each other by using an isocyanate compound, a silane coupling agent, an organic titanate crosslinker, an organic zirconium crosslinker, an organic aluminate, or the like.

Being provided with a reactive group, the monomers, oligomers, polymers, or the like are crosslinked to another resin skeleton by using an isocyanate compound, a silane coupling agent, an organic titanate crosslinker, an organic zirconium crosslinker, an organic aluminate, or the like.

In this way, crosslinkage using a reactive group makes it possible to obtain a polymer having an ethylenically unsaturated bond or an ethylenically unsaturated group, that is, a polymer having a solid form and having low tackiness at room temperature. Such a polymer has good formability and prevents the original plate from becoming dirty.

The thickness of the conversion layer 22 in the layered direction of the support layer 21 and the conversion layer 22 is preferably in the range of 0.2 μm or more to 10 μm or less. When the thickness of the conversion layer 22 is 10 μm or less, the thickness of the coating film for forming the conversion layer 22 can be made small enough to prevent the coating film-forming resin from being projected from the original plate or prevent the coating film from being wrinkled, when forming the flat surface 10f and the uneven surface 10c in the conversion layer 22. When the thickness of the conversion layer 22 is 0.2 μm or more, the thickness of the coating film for forming the conversion layer 22 can be made large enough to form the flat surface 10f and the uneven surface 10c.

The thickness of the conversion layer 22 in the layered direction of the support layer 21 and the conversion layer 22 is preferably one to ten times the depth of the concavities 22a in the uneven surface 10c, and more preferably, three to five times. By making the thickness of the conversion layer 22 one to ten times larger relative to the depth of the concavities 22a, the same effect can be obtained as when the thickness of the conversion layer 22 is in the range of 0.2 μm or more to 10 μm or less.

The uneven surface 10c serves as a surface for receiving light incident thereon and outputting the light to the light incident side, as light of a different state than the incident light. The uneven surface 10c preferably serves as a diffraction grating for diffracting visible light. The uneven surface 10c may serve as a relief hologram, a subwavelength grating, a Fresnel lens, a polarization element, a scattering element, or a light-condensing element. The uneven surface 10c may be imparted with two or more functions selected from the group of these functions.

The uneven surface 10c is configured by a plurality of concavities 22a arrayed in one direction at regular intervals, and convexities 22b each defined by two concavities 22a adjacent to each other in one direction. The concavities 22a and the convexities 22b are alternately and consecutively arrayed on the uneven surface 10c. In the uneven surface 10c, there is a height difference H in the layered direction of the support layer 21 and the conversion layer 22, i.e., in the thickness direction of the conversion layer 22, that is, there is a height difference H between the flat surface 10f and the bottom portion 22c. The height difference H is preferably in the range of 0.1 μm or more to 0.5 μm or less, and more preferably, in the range of 0.2 μm or more to 0.4 μm or less.

The plurality of concavities 22a of the uneven surface 10c may include a first concavity having a height difference H of a first value, and a second concavity having a height difference H of a second value that is different from the first value.

The distance between bottom portions 22c that are adjacent in the array direction of the concavities 22a and the convexities 22b is a concavo-convex pitch P. The concavo-convex pitch P is preferably in the range of 0.2 μm or more to 5 μm or less, and more preferably, in the range of 0.3 μm or more to 1 μm or less.

On the uneven surface 10c, each of the plurality of convexities 22b has a top portion 22d that includes a portion most protruded in the thickness direction of the conversion layer 22. The plurality of convexities 22b are each configured by the two reversely oriented arc surfaces 22e connected to each other at the top portion 22d. The two arc surfaces 22e each have a curvature forming an inward projection in the conversion layer 22 from the uneven surface 10c. Namely, the uneven surface 10c in a cross section in the thickness direction of the conversion layer 22 has a shape in which a plurality of parabolas are continuous in the arraying direction of the plurality of concavities 22a.

In the uneven surface 10c, since the convexities 22b are each configured by two arc surfaces 22e each having a curvature of forming an inward projection in the conversion layer 22 from the uneven surface 10c, adjacent convexities 22b have a larger distance therebetween toward the bottom from the top portion 22d. Therefore, the area allowing for easy adhesion of the metal piece layer 23 is large in the uneven surface 10c of the optical element 10.

Figure 3:
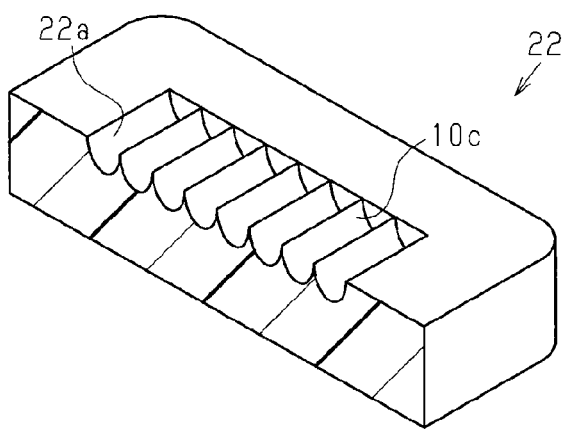
FIG. 3 is a perspective view illustrating a structure of an example of a conversion layer provided in an optical element, with part of the conversion layer cut away.
Figure 4:
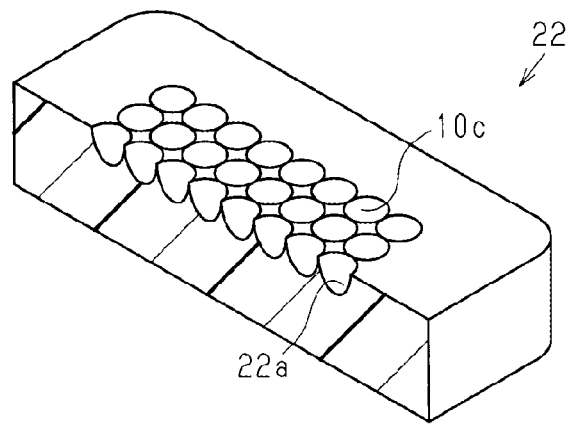
FIG. 4 is a perspective view illustrating a structure of an example of a conversion layer provided in an optical element, with part of the conversion layer cut away.

As shown in FIG. 3, the plurality of concavities 22a of the uneven surface 10c may be extended in one direction, and may be arrayed at regular intervals in the direction orthogonal to that direction mentioned above. As shown in FIG. 4, the plurality of concavities 22a of the uneven surface 10c may be arrayed at regular intervals in both the extended direction and the direction orthogonal to the extended direction. Alternatively, the uneven surface 10c may include a portion where a plurality of concavities 22a are extended in one direction and arrayed at regular intervals in the direction orthogonal to the extended direction, and a portion where a plurality of concavities 22a are arrayed at regular intervals in both the extended direction and the direction orthogonal to the extended direction.

The uneven surface 10c may have an outer shape that is not a predetermined known shape recognizable by an observer of the optical element 10, and thus may have, for example, a geometric shape, such as polygonal shape or a circular shape. The uneven surface 10c may have an outer shape containing information recognizable by an observer, such as a shape of a motif, a figure, a pattern, a letter, a numeral, or a symbol. When the incident surface 10s is configured to include a plurality of uneven surfaces 10c independent of each other, the plurality of uneven surfaces 10c may form a single shape such as a motif, a figure, a pattern, a letter, a numeral, or a symbol.

As stated above, in the optical element 10, the front surface is a surface of the conversion layer 22 on a side opposite to the surface contacting the support layer 21, and the back surface is a surface of the support layer 21 on a side opposite to the surface contacting the conversion layer 22. In the optical element 10, the uneven surface 10c of the conversion layer 22 outputs light incident on the conversion layer 22 toward the front surface as light of a different state than the incident light. With this configuration, even when the support layer 21 and the conversion layer 22 do not have optical transparency, the conversion layer 22 serves as the abovementioned optical element. Therefore, the support layer 21 and the conversion layer 22 may not each have, or may each have optical transparency.

In the optical element 10, the front surface may be a surface of the support layer 21 on a side opposite to the surface contacting the conversion layer 22, and the back surface may be a surface of the conversion layer 22 on a side opposite to the surface contacting the support layer 21. With this configuration, the uneven surface 10c of the conversion layer 22 outputs light incident on the incident surface 10s, i.e., the surface including the flat surface 10f and the uneven surface 10c, toward the front surface, as light of a different state than the incident light. Therefore, the conversion layer 22 and the support layer 21 both need to have optical transparency.

[Method of Producing the Optical Element]

Referring now to FIGS. 5 to 11, a method of producing the optical element 10 will be described.

Figure 5:
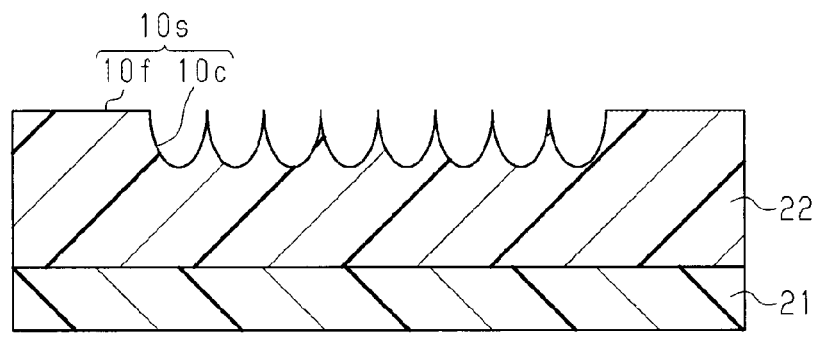
FIG. 5 is a diagram illustrating a processing step of forming a conversion layer in a method of producing an optical element.

As shown in FIG. 5, when producing the optical element 10, first, a conversion layer 22 is formed on a surface of the support layer 21. For example, the conversion layer 22 is formed by a coating method. The coating method may be a wet coating method in which an ink dissolved or dispersed with the material forming the conversion layer 22 is applied to the support layer 21, and then only the solvent is dried and removed. The wet coating increases the rate of forming the conversion layer 22, and decreases the cost of forming the conversion layer 22.

Prior to drying the conversion layer 22, the uneven surface 10c and the flat surface 10f are formed on a surface of the conversion layer 22 on a side opposite to the surface contacting the support layer 21. Examples of the process of forming the uneven surface 10c and the flat surface 10f include a pressing process, a casting process, and a photopolymer process. The photopolymer process is also referred to as a 2P process or a photosensitive resin process. For example, the pressing process is exemplified in JP 4194073 B, the casting process is exemplified in JP 2524092 Z, and the photopolymer process is exemplified in JP 4088884 B.

Of these processes, the photopolymer process forms the conversion layer 22 as follows. In the photopolymer process, an ionizing radiation-curable resin is injected between a relief mold for duplicating the uneven surface and the flat surface, and the flat support layer 21, followed by irradiating ionizing radiation to the ionizing radiation-curable resin to thereby cure the ionizing radiation-curable resin. Then, the conversion layer 22 that is a cured film is peeled from the duplication mold together with the support layer 21, thereby forming the conversion layer 22 provided with the uneven surface 10c and the flat surface 10f.

The conversion layer 22 formed by the photopolymer process has high accuracy in the shape of the uneven surface 10c compared to the conversion layer 22 formed by the pressing process or the casting process using a thermoplastic resin, and has high heat resistance and chemical resistance. Examples of the method of forming the conversion layer 22 include a method of using an ionizing radiation-curable resin which is solid at room temperature, or using an ionizing radiation-curable resin which is highly viscous at room temperature, and a method of adding a release agent to an ionizing radiation-curable resin.

Figure 6:
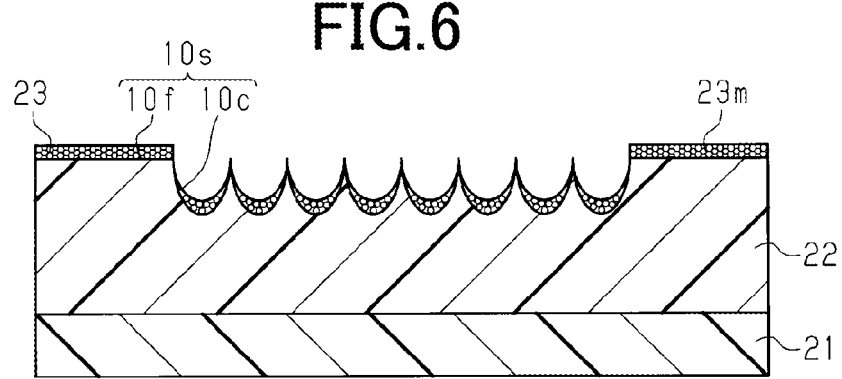
FIG. 6 is a diagram illustrating a processing step of forming a metal piece layer in the method of producing the optical element.

As shown in FIG. 6, in the conversion layer 22, the metal piece layer 23 formed of a plurality of metal pieces 23m is formed on the entirety of the surface having the uneven surface 10c and the flat surface 10f.

For example, the metal piece layer 23 can be formed using any of the following seven methods. With the first method, the metal piece layer 23 is formed by forming a plurality of metal pieces 23m, one by one, by vacuum deposition using a mask. The mask is formed with approximately the same number of openings as a plurality of metal pieces 23m for forming the metal piece layer 23, to thereby form a plurality of metal pieces 23m, one by one, by deposition through the respective plurality of openings. The diameter of each opening should fall in the abovementioned preferable range of the diameter of the metal piece 23m, and the distance between adjacent openings should fall in the abovementioned preferable range of the metal piece pitch.

With the second method, first, a resin layer, which dissolves in a solvent, is formed as a negative pattern for a plurality of metal pieces 23m, on a surface of the conversion layer 22 on a side opposite to the surface contacting the support layer 21. Then, a thin metal film is formed so as to cover the entirety of the resin layer, followed by removing the resin layer and the thin metal film on the resin layer from the conversion layer 22 using a solvent, to thereby form a plurality of metal pieces 23m one by one by, as a result of which, the metal piece layer 23 is formed.

With the third method, first, a resin layer which is easily peeled from the conversion layer 22 is formed on a surface of the conversion layer 22 on a side opposite to the surface contacting the support layer 21. The resin layer has an adhesive force to the conversion layer 22 which is smaller than the adhesive force between the conversion layer 22 and a thin metal film. In this case, the resin layer is formed as a negative pattern for a plurality of metal pieces 23m for forming the metal piece layer 23. Then, a thin metal film is formed so as to cover the entirety of the resin layer, followed by pressing an adhesive roller, an adhesive paper or the like against the thin metal film, to thereby transfer the resin layer to the adhesive roller, the adhesive paper or the like. Thus, the thin metal film on the resin layer is removed from the conversion layer 22 together with the resin layer, to thereby form a plurality of metal pieces 23m one by one, as a result of which, the metal piece layer 23 is formed.

With the fourth method, first, a thin metal film is formed on the entirety of the incident surface 10s of the conversion layer 22. Then, a pattern corresponding to a plurality of metal pieces 23m for forming the metal piece layer 23 is formed on a surface of the thin metal film on a side opposite to the surface contacting the conversion layer 22, using a chemical resistant resin layer. Then, portions of the thin metal film exposed from the resin layer are dissolved by an alkaline or acidic etching solution, for removal from the conversion layer 22. Thus, a plurality of metal pieces 23m are formed one by one, thereby forming the metal piece layer 23. In this method, the chemical resistant resin layer may be removed after the metal piece layer 23 is formed from the thin metal film.

With the fifth method, first, a thin metal film is formed on the entirety of the incident surface 10s of the conversion layer 22. Then, a photosensitive resin layer is formed on a surface of the thin metal film on a side opposite to the surface contacting the conversion layer 22. Then, the photosensitive resin layer is exposed and developed sequentially, so that a pattern corresponding to a plurality of metal pieces 23m for forming the metal piece layer 23 is formed on the photosensitive resin. Then, portions of the thin metal film exposed from the photosensitive resin layer are dissolved by an alkaline or acidic etching solution, for removal from the conversion layer 22. Thus, a plurality of metal pieces 23m are formed one by one, thereby forming the metal piece layer 23.

With the sixth method, a thin metal film is formed on the entirety of the incident surface 10s of the conversion layer 22, followed by irradiating a laser beam to the thin metal film to remove the portions of the thin metal film irradiated by the laser beam. The laser beam is irradiated to portions of the thin metal film so that a plurality of metal pieces 23m are formed with gaps therebetween. Thus, the portion of the thin metal film that has remained on the incident surface 10s of the conversion layer 22 forms the metal piece layer 23.

With the seventh method, a deposition method using tin as a vapor deposition source is used to form a plurality of metal pieces 23m, one by one, on the conversion layer 22. According to the deposition method using tin as the vapor deposition source, predetermined conditions for vapor deposition rate, vapor deposition film thickness, and the like are selected to form a metal piece layer 23 in which a plurality of metal pieces 23m are arrayed, that is, a metal piece layer 23 in which non-deposited portions and deposited portions are irregularly arranged. According to the deposition method using tin as the vapor deposition source, if conditions are met for forming a metal piece layer 23 with non-deposited portions and deposited portions being irregularly arranged, the diameter of each metal piece 23m should fall in the preferable range, and the metal piece pitch should fall in the preferable range.

In each of the first to seventh methods, a plurality of metal pieces 23m may be formed being arranged irregularly, or may be formed being arranged regularly, on the incident surface 10s of the conversion layer 22. Alternatively, a plurality of metal pieces 23m may be formed, including an irregularly arranged portion and a regularly arranged portion.

When the particle size, i.e., the diameter, of the metal piece 23m is in the range of 0.02 µm or more to 0.5 µm or less, and the metal piece pitch is in the range of 0.01 µm or more to 0.1 µm or less, the uneven surface 10c preferably satisfies the following conditions. Namely, the height difference H in the uneven surface 10c is preferably 0.5 µm or less. When the height difference H is 0.5 µm or less, the space surrounded by surfaces of each concavity 22a becomes a size allowing for easy formation of the metal piece layer 23. The concavo-convex pitch P is preferably 0.2

µm or more. When the concavo-convex pitch P is 0.2 µm or more, the opening of each concavity 22a becomes a size allowing for easy formation of the metal piece layer 23.

Figure 7:
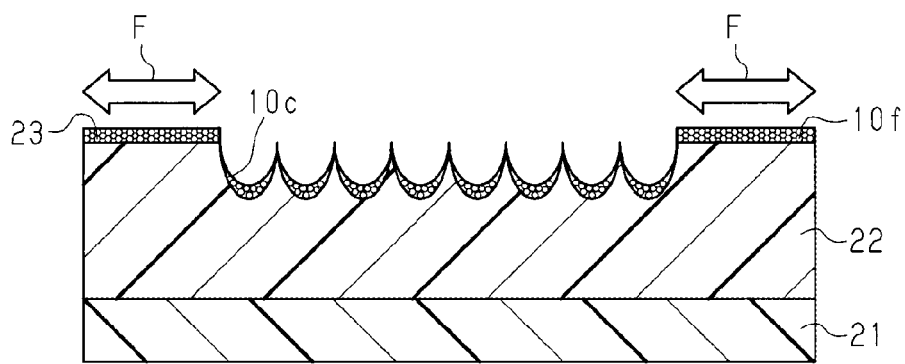
FIG. 7 is a diagram illustrating a processing step of removing part of the metal piece layer from the conversion layer in the method of producing the optical element.

As shown in FIG. 7, a shearing-direction force F is applied to the flat surface 10f of the conversion layer 22 in the metal piece layer 23. The shearing-direction force F is a frictional force applied to a surface of the metal piece layer 23 on a side opposite to the surface contacting the conversion layer 22.

Figure 8:
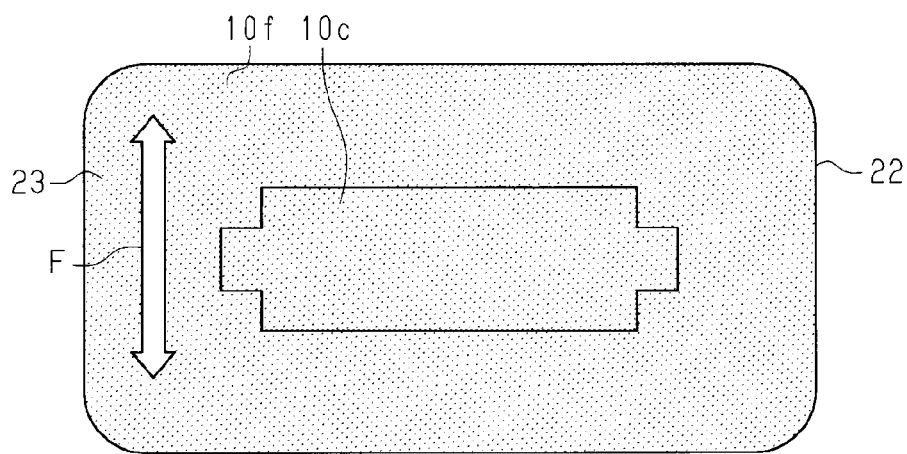
FIG. 8 is a diagram illustrating a processing step of removing part of the metal piece layer from the conversion layer in the method of producing the optical element.

As shown in FIG. 8, the shearing-direction is a direction orthogonal to the layered direction of the conversion layer 22 and the metal piece layer 23, i.e., a direction orthogonal to the thickness direction of the metal piece layer 23, i.e., the direction in which the position of the metal piece layer 23 displaces relative to the conversion layer 22.

When the shearing-direction force F is applied to the flat surface 10f of the metal piece layer 23, it is preferred to use a member formed of a material with a hardness of not damaging the conversion layer 22. In this case, the member preferably has a size of not contacting the metal piece layer 23 formed on the uneven surface 10c. Also, in this case, the position of the member relative to the metal piece layer 23 preferably changes in the shearing-direction, with the member being in a state of contacting the flat surface 10f of the metal piece layer 23. In this case, the frictional force generated between the metal piece layer 23 and the member acts as the shearing-direction force F.

Figure 9:
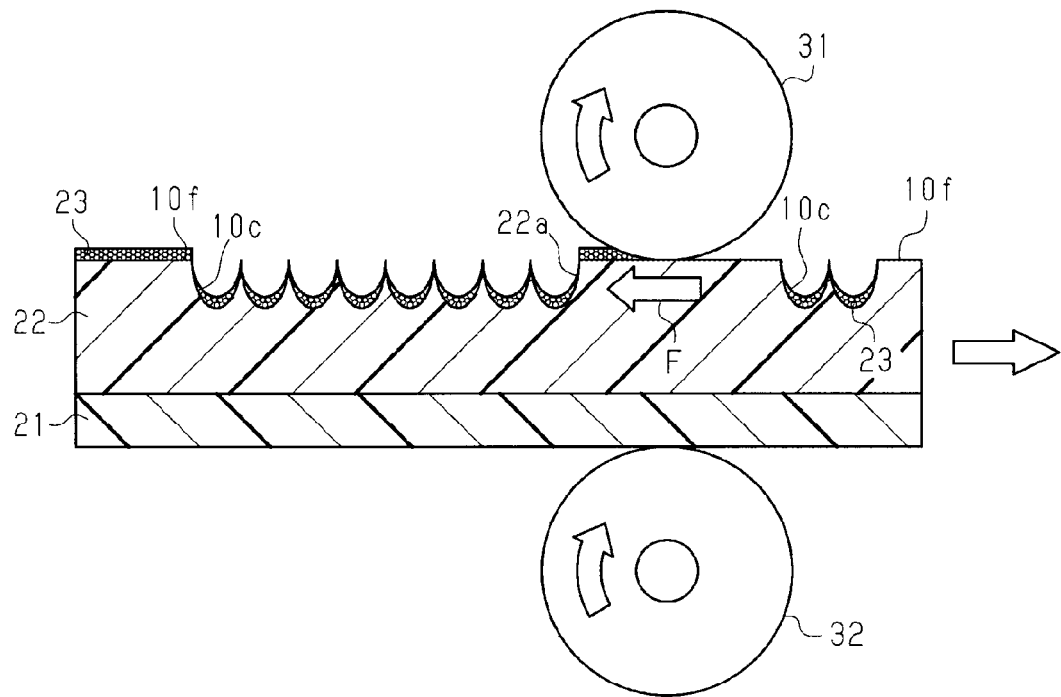
FIG. 9 is a diagram illustrating an example of a processing step of removing part of the metal piece layer from the conversion layer in the method of producing the optical element.
Figure 10:
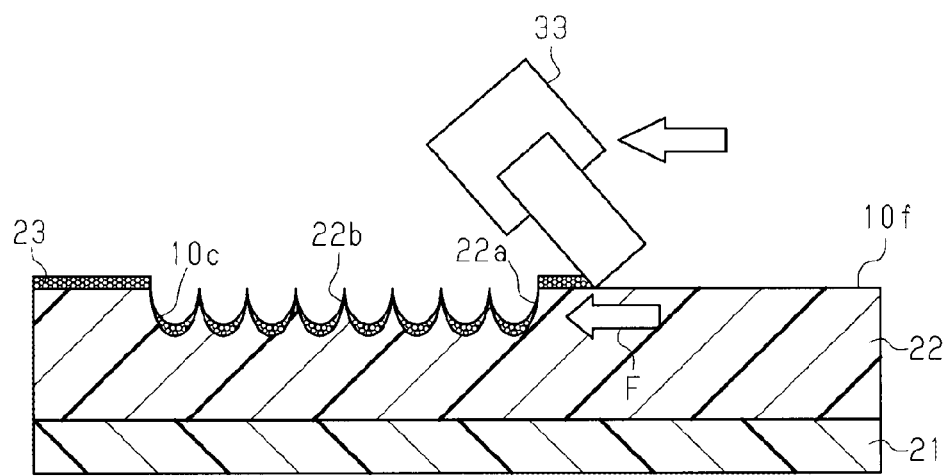
FIG. 10 is a diagram illustrating an example of a processing step of removing part of the metal piece layer from the conversion layer in the method of producing the optical element.

Referring now to FIGS. 9 and 10, methods of applying the shearing-direction force F to the metal piece layer 23 will be described by way of two examples.

As shown in FIG. 9, using a removal roller 31 and a conveyance roller 32, the shearing-direction force F can be applied to the metal piece layer 23. The conveyance roller 32 conveys a layered body formed of the support layer 21, the conversion layer 22, and the metal piece layer 23. The removal roller 31 and the conveyance roller 32 are arranged in one direction parallel to each other. The removal roller 31 and the conveyance roller 32 sandwich the layered body in the direction in which the two rollers are arranged. The removal roller 31 rotates clockwise, for example, in a state of contacting the metal piece layer 23, and the conveyance roller 32 rotates in the same direction as the removal roller 31 in a state of contacting the support layer 21, to thereby convey the layered body from left to right as viewed in the figure.

The removal roller 31 rotates in the direction opposite to the conveyance direction of the layered body, in a portion where the removal roller 31 contacts the metal piece layer 23 formed on the flat surface 10f of the conversion layer 22. With the rotation, a frictional force that is the shearing-direction force F is generated in the interface between the removal roller 31 and the metal piece layer 23. The metal piece layer 23 formed on the flat surface 10f of the conversion layer 22 is removed from the conversion layer 22 by the shearing-direction force F.

The removal roller 31 is sufficiently larger than the opening of each of the concavities 22a constructing the uneven surface 10c of the conversion layer 22. Thus, the removal roller 31 hardly contacts the metal piece layer 23 formed on the uneven surface 10c whose surface is recessed more toward the support layer 21 than the flat surface 10f. Therefore, at least part of the metal piece layer 23 formed on the uneven surface 10c remains on the conversion layer 22.

The entirety of the metal piece layer 23 formed on the flat surface 10f may be removed from the conversion layer 22, or part of the metal piece layer 23 formed on the flat surface 10f may be pushed into the space surrounded by surfaces of each concavity 22a by the removal roller 31, for transfer from the flat surface 10f to the uneven surface 10c.

The removal roller 31 and the conveyance roller 32 are preferably highly elastic rubber rollers. The material forming the removal roller 31 and the conveyance roller 32 is preferably NBR rubber, silicone rubber, EPDM rubber, urethane rubber, or the like.

When the material forming the removal roller 31 and the conveyance roller 32 is electrically conductive, static electricity is prevented from being generated between the removal roller 31 or the conveyance roller 32 and the layered body. Accordingly, the layered body is prevented from adhering to the removal roller 31 or the conveyance roller 32, and further, work for removing the metal piece layer 23 formed on the flat surface 10f becomes easy to perform. Examples of the rubber roller formed of an electrically conductive material include white conductive rubber rollers, such as White Elecon (manufactured by Meiwa Rubber Co., Ltd.), Softer Elecon (manufactured by Meiwa Rubber Co., Ltd.), or the like.

The hardness, size and the like of the removal roller 31 may be selected according to the material forming the conversion layer 22, the thickness of the conversion layer 22, the frictional heat generated between the removal roller 31 and the metal piece layer 23, the conveyance speed of the layered body, and the like.

As shown in FIG. 10, the shearing-direction force F can be applied to the metal piece layer 23 using a removal squeegee 33. The layered body including the support layer 21, the conversion layer 22 and the metal piece layer 23 is fixed at a predetermined position such as by a jig.

The removal squeegee 33 is pressed against the metal piece layer 23 formed on the flat surface 10f of the conversion layer 22 of the layered body. When the removal squeegee 33 is moved in the removal direction of the metal piece layer 23, e.g., from right to left as viewed in the figure, a frictional force that is the shearing-direction force F is generated in the interface between the removal squeegee 33 and the metal piece layer 23. The metal piece layer 23 formed on the flat surface 10f of the conversion layer 22 is removed from the conversion layer 22 due to the shearing-direction force F.

The removal squeegee 33 has an end face contacting the metal piece layer 23. This end face is sufficiently larger than each of the concavities 22a and convexities 22b of the uneven surface 10c. Thus, the end face of the removal squeegee 33 hardly contacts the metal piece layer 23 formed on the uneven surface 10c that is recessed more toward the support layer 21 than the flat surface 10f. Therefore, at least part of the metal piece layer 23 formed on the uneven surface 10c remains on the conversion layer 22.

The entirety of the metal piece layer 23 formed on the flat surface 10f may be removed from the conversion layer 22, or part of the metal piece layer 23 formed on the flat surface 10f may be pressed into the space surrounded by surfaces of each concavity 22a by the removal squeegee 33, for transfer from the flat surface 10f to the uneven surface 10c.

When at least part of the metal piece layer 23 is transferred from the flat surface 10f into the uneven surface 10c, the film thickness may increase in each of the concavities 22a constituting the uneven surface 10c, from start to end points of movement of the removal squeegee 33. Alternatively, in the direction in which the flat surface 10f and the plurality of concavities 22a are arranged, the metal piece layer 23 formed in the concavities 22a may have a larger thickness toward the flat surface 10f.

The material forming the removal squeegee 33 preferably has high elasticity with a hardness not damaging the conversion layer 22, and thus is preferably an engineering plastic, rubber, or the like. The removal squeegee 33 may be any of a flat squeegee, an angled squeegee, and a double layer sword squeegee. The thickness, length, and hardness of the removal squeegee 33 may be selected according to the shape of the uneven surface 10c of the conversion layer 22.

When the concavities 22a of the uneven surface 10c are configured to extend in one direction in the uneven surface 10c as mentioned referring to FIG. 3, the amount of the metal pieces 23m remaining in the uneven surface 10c can be changed depending on the angle formed between the direction of moving the removal squeegee 33 and the direction of extending the concavities 22a.

Specifically, when the direction of moving the removal squeegee 33 is orthogonal to the direction of extending the concavities 22a, the shearing-direction force F is unlikely to act on the inside of the concavities 22a. Therefore, the metal piece 23m in the space surrounded by surfaces of each concavity 22a is unlikely to be scraped to the outside of the spaces.

When the direction of moving the removal squeegee 33 is parallel to the direction of extending the concavities 22a, the shearing-direction force F easily acts on the inside of the concavities 22a compared to when the direction of moving the removal squeegee 33 is orthogonal to the extending direction of the concavity 22a. Therefore, the metal piece 23m in the space surrounded by surfaces of each concavity 22a is easily scraped to the outside of the spaces.

Therefore, when the direction of moving the removal squeegee 33 is changed relative to the direction of extending the concavities 22a during the movement of the removal squeegee 33 on the uneven surface 10c, portions with different amount of adhesion of the metal pieces 23m can be formed in the uneven surface 10c. Thus, portions having different appearance are formed on the metal piece layer 23.

Alternatively, even when the movement direction of the removal squeegee 33 is constant, if the uneven surface 10c has the following configuration, portions with different amount of adhesion of the metal pieces 23m can be formed in the uneven surface 10c. Namely, the uneven surface 10c may include a portion including a plurality of concavities extended in one direction and a portion including a plurality of concavities extending in another direction.

When the height difference H in the uneven surface 10c is 0.1 µm or more, the height difference of the concavities 22a becomes large for the shearing-direction force F to easily and selectively occur in the flat surface 10f. When the concavo-convex pitch P is 5 µm or less, the openings of the concavities 22a become small for the shearing-direction force F to easily and selectively occur in the flat surface 10f. Consequently, in the metal piece layer 23 formed on the conversion layer 22, the part formed on the flat surface 10f can be easily and selectively removed from the conversion layer 22.

Figure 11:
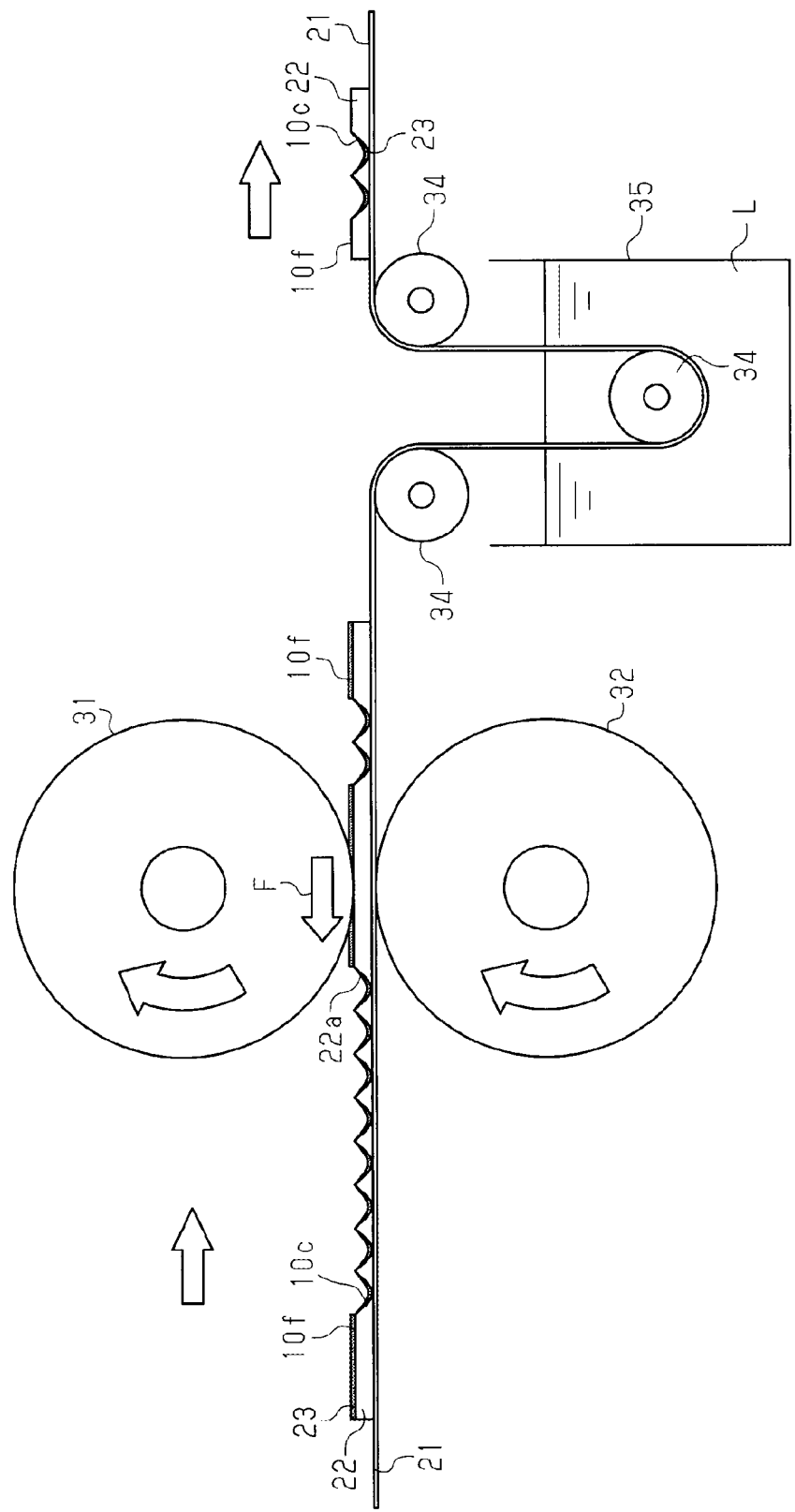
FIG. 11 is a diagram illustrating an example of a processing step of removing part of the metal piece layer from the conversion layer in the method of producing the optical element.

Referring to FIG. 11, another method of removing the metal piece layer 23 from the flat surface 10f of the conversion layer 22 will be described. The method described referring to FIG. 11 is similar to the method described referring to FIG. 9 in that the removal roller 31 applies the shearing-direction force F to the metal piece layer 23, but is different in that the metal piece layer 23 is not removed from the conversion layer 22 by only the application of the shearing-direction force F.

As shown in FIG. 11, the removal roller 31 is rotated, while contacting the metal piece layer 23, in a direction opposite from the direction in which the layered body is conveyed, to generate the shearing-direction force F in the interface between the metal piece layer 23 formed on the flat surface 10f and the removal roller 31. It should be noted that the shearing-direction force F in this case has a magnitude which can damage the metal piece layer 23, but which is smaller than the magnitude that can remove the metal piece layer 23 from the conversion layer 22.

The size of the removal roller 31 is sufficiently larger than the size of the opening of each of the concavities 22a constituting the uneven surface 10c of the conversion layer 22. Thus, the removal roller 31 hardly contacts the metal piece layer 23 formed on the uneven surface 10c which is recessed more toward the support layer 21 than the flat surface 10f. Therefore, the metal piece layer 23 formed on the uneven surface 10c is not damaged.

The layered body that has passed through the removal roller 31 passes through a cleaning tank 35 while being conveyed by a plurality of conveyance rollers 34. The cleaning tank 35 accommodates a cleaning liquid L for removing the metal piece layer 23 from the conversion layer 22. Examples of the cleaning liquid L include pure water, an acidic solution, an alkaline solution, and the like. The cleaning tank 35 may be configured by a plurality of tanks accommodating cleaning liquids L different from each other. Thus, with the layered body being immersed in the cleaning liquid L, part of the metal piece layer 23 formed on the conversion layer 22 is removed from the conversion layer 22.

In the metal piece layer 23, since the part formed on the flat surface 10f is likely to have been damaged by the removal roller 31, the metal piece layer 23 formed on the flat surface 10f is more easily removed from the conversion layer 22 than the metal piece layer 23 formed on the uneven surface 10c.

Accordingly, in the metal piece layer 23, a shorter time is required for the part formed on the flat surface 10f than for the part formed on the uneven surface 10c, when the parts are removed from the conversion layer 22 by the cleaning liquid L. The time of immersing the layered body in the cleaning liquid L is set such that, in the metal piece layer 23, the part formed on the flat surface 10f will be removed from the conversion layer 22, and the part formed on the uneven surface 10c will not be removed from the conversion layer 22.

The shearing-direction force F may be applied to part of the metal piece layer 23 by the removal squeegee 33. Alternatively, in the metal piece layer 23, the part formed on the flat surface 10f may be removed from the conversion layer 22 by the shearing-direction force F, and then the optical element 10 may be cleaned by the cleaning liquid. Thus, the metal pieces 23m that have been removed from the flat surface 10f and adhered to the layered body are removed from the layered body.

[Configuration of Card]

Figure 12:
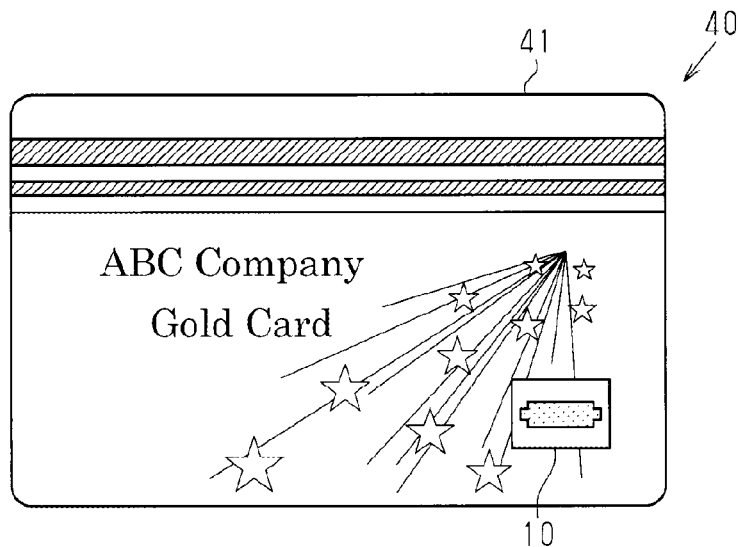
FIG. 12 is a plan view illustrating a structure according to an embodiment in which the article of the present invention is embodied as a card.

Referring now to FIG. 12, an embodiment of an article of the present invention embodied in the form of a card will be described.

As shown in FIG. 12, a card 40 includes a base material 41 having a plate shape. Specifically, the card 40 includes the base material 41 made of plastic, and the optical element 10. For example, the optical element 10 is fixed to a surface of the base material 41 by means of an adhesive layer. For example, the optical element 10 is prepared as a label or a transfer foil having an adhesive layer, and adhered to the base material 41.

Since the card 40 is provided with the optical element 10 exerting optical effects, counterfeiting of the card 40 is more difficult.

EXPERIMENTAL EXAMPLES

Experimental Example 1

A PET film with a thickness of 50 μm was prepared as a support layer, followed by applying an ink made of the following materials to a surface of the PET film by gravure printing, thereby forming a conversion layer with a thickness of 3 μm.

[Conversion Layer Ink]

| | |
|---|---|
| Acrylic resin | 6 parts by mass |
| Nitrocellulose | 4 parts by mass |
| MEK/cyclohexanone mixed solvent | 20 parts by mass |

Then, a cylindrical original plate for forming a flat surface and an uneven surface was pressed against a surface of the conversion layer on a side opposite to the surface contacting the support layer. In this case, the pressing pressure of the original plate was set to 2 Kgf/cm$^2$, the pressing temperature was set to 180° C., and the pressing speed was set to 10 m/min. The height difference in the uneven surface was set to 0.4 nm, the concavo-convex pitch was set to 0.3 nm, and the conversion layer was ensured to have a thickness-direction cross section of concavities, where a plurality of parabolas were continuous in one direction.

Then, tin was deposited on the entire surface of the conversion layer, i.e. the surface having the flat surface and the uneven surface, to form a metal piece layer made of a plurality of tin particles. In this case, tin deposition conditions were set so that the average of the metal piece pitches of the tin particles was 0.1 nm, and the average particle size of the tin particles was 0.02 nm.

The layered body including the support layer, the conversion layer, and the metal piece layer were fixed, and while a flat removal squeegee made of an ester-based polyurethane resin was pressed against the metal piece layer, the position of the removal squeegee relative to the metal piece layer was changed. The pressure for pressing the removal squeegee against the metal piece layer was set to 0.2 MPa, and the movement speed of the removal squeegee was set to 10 mm/sec. Thus, a shearing-direction force was generated in the interface between the squeegee and the metal piece layer to thereby remove the metal piece layer formed on the flat surface of the conversion layer. Since the removal squeegee was sufficiently larger than each concavity of the uneven surface, an end face of the removal squeegee was not in contact with the metal piece layer formed in the space surrounded by surfaces of each concavity.

Then, the layered body was immersed in a cleaning tank containing pure water to sufficiently wash away the metal pieces which were removed from the conversion layer. Then, an ink made of the following materials was applied to a release member by using a hot melt knife coater. Specifically, the ink was applied to a release-treated surface of a release member (SP-8K manufactured by Lintec Corporation) having a thickness of 90 μm. Thus, an adhesive layer with a thickness of 50 μm was formed on the release member. Then, the conversion layer was bonded to the adhesive layer via the surface of the conversion layer, on which the metal piece layer was formed, thereby obtaining an optical element of Experimental Example 1.

[Adhesive Layer Ink]

| | |
|---|---|
| Acrylic adhesive | 100 parts |

Experimental Example 2

With an exception of setting the height difference in the uneven surface to 0.05 μm, a method similar to Experimental Example 1 was used to produce an optical element.

Experimental Example 3

With an exception of setting the height difference in the uneven surface to 1 μm, a method similar to Experimental Example 1 was used to produce an optical element.

Experimental Example 4

With an exception of setting the concavo-convex pitch in the uneven surface to 0.1 μm, a method similar to Experimental Example 1 was used to produce an optical element.

Experimental Example 5

With an exception of setting the concavo-convex pitch in the uneven surface to 6 μm, a method similar to Experimental Example 1 was used to produce an optical element.

[Evaluations of Experimental Examples]

For each of the optical elements of Experimental Examples 1 to 5, the metal piece layer formed on the flat surface and the metal piece layer formed on the uneven surface of the conversion layer were observed being enlarged using a microscope. In the optical element of Experimental Example 1, it was confirmed that the metal piece layer was not formed on the flat surface, but was formed on the uneven surface.

In contrast, in the optical elements of Experimental Examples 2 to 5, it was confirmed that the metal piece layer was formed on neither the flat surface nor the uneven surface of the conversion layer 22. Of these experimental examples, in Experimental Example 2, the height difference in the uneven surface was small to an extent of permitting a shearing-direction force, when applied to the flat surface, to also act on the metal piece layer formed on the uneven surface. Accordingly, in Experimental Example 2, it was confirmed that the metal piece layer was formed on neither the flat surface nor the uneven surface. However, in Experimental Example 3, the height difference in the uneven surface was large to an extent of not permitting formation of the metal piece layer in the space surrounded by surfaces of each concavity. Accordingly, in Experimental Example 3, it was confirmed that the metal piece layer was formed on neither the flat surface nor the uneven surface.

Further, in Experimental Example 4, the opening of each concavity was small to an extent of not permitting formation of the metal piece layer on the inside of the concavity. Accordingly, it was confirmed that the metal piece layer was formed on neither the flat surface nor the uneven surface. In Experimental Example 5, the opening of each concavity was large to an extent of permitting a shearing-direction force, when applied to the flat surface, to also act on the metal piece layer formed on the uneven surface. Accordingly, it was confirmed that the metal piece layer was formed on neither the flat surface nor the uneven surface.

As described above, according to the embodiment of the optical element, the article, and the method of producing the optical element, the following advantageous effects can be obtained.

(1) Since the layer covering the uneven surface 10c is the metal piece layer 23 formed of a plurality of metal pieces 23m, the optical element 10 expresses an appearance which is different from the configuration formed simply of a metal film in which the metal atoms are substantially uniformly arrayed.

(2) Since each convexity 22b is configured by two arc surfaces 22e each having a curvature of forming an inward projection in the conversion layer 22 from the uneven surface 10c, adjacent convexities 22b have a larger distance therebetween toward the bottom from the top portion 22d. Therefore, in the uneven surface 10c of the optical element 10, the area of the portion where the metal piece layer 23 easily adheres is large.

(3) The height difference H in the uneven surface 10c is in the range of 0.1 μm or more to 0.5 μm or less, and the concavo-convex pitch P is in the range of 0.2 μm or more to 5 μm or less. Moreover, the diameter of the metal pieces 23m is in the range of 0.02 μm or more to 0.5 μm or less, and the metal piece pitch is in the range of 0.01 μm or more to 0.1 μm or less. Therefore, the metal pieces 23m easily adhere to the concavities 22a of the conversion layer 22, and even if a member on the outside of the optical element 10 touches the optical element 10, the metal pieces 23m adhered to the concavities 22a are resistant to being peeled off.

The abovementioned embodiment can be appropriately modified and implemented as follows.

[Cross-sectional Shape of Uneven Surface]

Referring to FIGS. 13 to 19, the cross-sectional shape in the thickness direction of the conversion layer 22 in the uneven surface in a modification will be described. In FIGS. 13 to 19, the components common to those of the abovementioned embodiment are given the same reference signs as in the embodiment to omitted specific description.

In the abovementioned embodiment, the curvature in the bottom portion 22c may be greater than the curvature at the top portion 22d in each of the plurality of concavities 22a. Namely, the cross-section in the thickness direction of the conversion layer 22 in each concavitiy 22a may be arc-shaped, and the cross-section in the thickness direction of the conversion layer 22 in each convexity 22b may be arc-shaped. In such an uneven surface 10c, since the curvature in the bottom portion 22c is greater than the curvature in the top portion 22d, the bottom portion 22c of each concavity 22a is broad. Therefore, in the uneven surface 10c of the optical element 10, the area of the portion where the metal piece layer 23 easily adheres is large.

Figure 13:
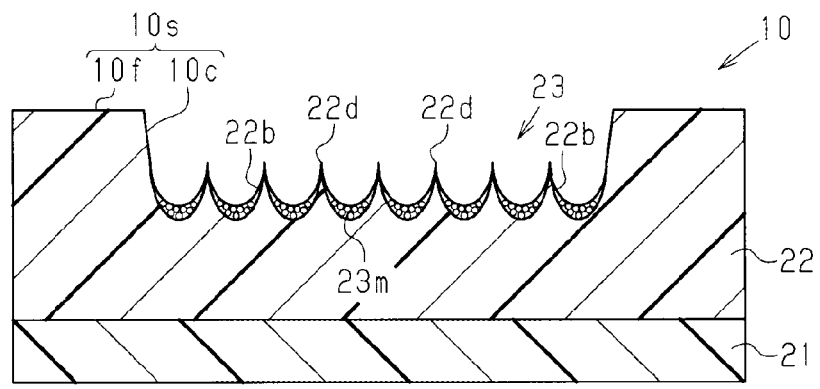
FIG. 13 is a cross-sectional view illustrating a structure according to a modification of the optical element.

As shown in FIG. 13, the plurality of convexities 22b of the uneven surface 10c may be located at a lower level than the flat surface 10f in the thickness direction of the conversion layer 22. Namely, the top portions 22d of the convexities 22b may be located at a lower level than the flat surface 10f in the thickness direction of the conversion layer 22.

With this configuration, the following advantageous effects are obtained.

(4) Since the plurality of convexities 22b are located at a lower level than the flat surface 10f, when a member different than the optical element 10 contacts the flat surface 10f, the member hardly contacts the plurality of convexities 22b. Therefore, the metal piece layer 23, which is located on the convexities 22b that are at a lower level than the flat surface 10f, is prevented from being peeled off from the convexities 22b due to the member brought into contact with the optical element 10. Further, when the shearing-direction force F is applied to the flat surface 10f during the production process of the optical element 10, since the plurality of convexities 22b are at a lower level than the flat surface 10f, the removal roller 31 and the removal squeegee 33 are further prevented from contacting the plurality of convexities 22b. Therefore, the metal piece layer 23 located on the flat surface 10f is easily selectively removed.

Figure 14:
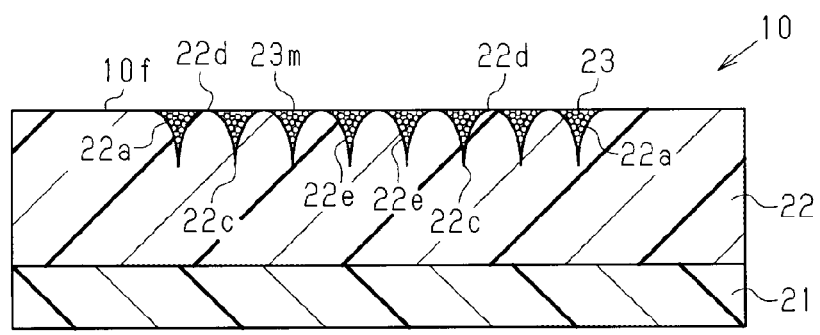
FIG. 14 is a cross-sectional view illustrating a structure according to a modification of the optical element.

As shown in FIG. 14, each concavity 22a may be configured by two arc surfaces 22e connected at the bottom portion 22c and facing each other. The two arc surfaces 22e may each have a curvature of forming an outward projection in the conversion layer 22 from the uneven surface 10c.

With this configuration, the following advantageous effects are obtained.

(5) Since each concavity 22a is configured by the two arc surfaces 22e each having a curvature of forming an outward projection in the conversion layer 22 from the uneven surface 10c, the space surrounded by surfaces of the concavity 22a near the top portion 22d is relatively large, and the space surrounded by surfaces of the concavity 22a near the bottom portion 22c is relatively small. Therefore, a member on the outside of the optical element 10 hardly enters the concavities 22a. As a result, the metal piece layer 23 positioned on the bottom portions 22c of the concavities 22a is resistant to being peeled off from the concavities 22a. Further, when the shearing-direction force F is applied to the flat surface 10f during the production process of the optical element 10, the removal roller 31 and the removal squeegee 33 hardly enter the concavities 22a. Therefore, the metal piece layer 23 located on the flat surface 10f is easily selectively removed.

In each of the plurality of concavities 22a, the curvature in the top portion 22d may be greater than the curvature in the bottom portion 22c. Namely, the cross-section in the thickness direction of the conversion layer 22 in each concavity 22a may be arc-shaped, and the cross-section in the thickness direction of the conversion layer 22 in each convexity 22b may be arc-shaped. In such an uneven surface 10c, since the curvature of the top portion 22d is greater than the curvature of the bottom portion 22c, the space surrounded by surfaces of each concavity 22a near the top portion 22d is relatively large, and the space surrounded by surfaces of the concavity 22a near the bottom portion 22c is relatively small. Therefore, a member on the outside of the optical element 10 hardly enters the concavities 22a. As a result, the metal piece layer 23 positioned on the bottom portions 22c of the concavities 22a is resistant to being peeled off from the concavities 22a.

Figure 15:
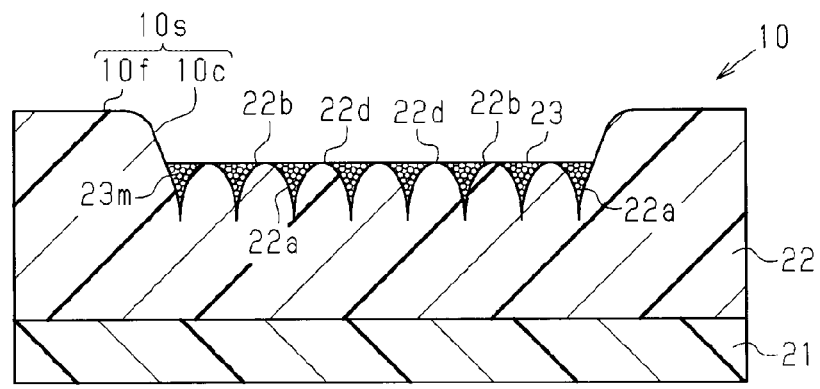
FIG. 15 is a cross-sectional view illustrating a structure according to a modification of the optical element.

As shown in FIG. 15, in the configuration described referring to FIG. 14, the plurality of convexities 22b may be located at a lower level than the flat surface 10f in the thickness direction of the conversion layer 22. Namely, the top portions 22d of the convexities 22b may be at a lower level than the flat surface 10f in the thickness direction of the conversion layer 22. With this configuration, advantageous effects equivalent to the abovementioned items (4) and (5) can be obtained.

Figure 16:
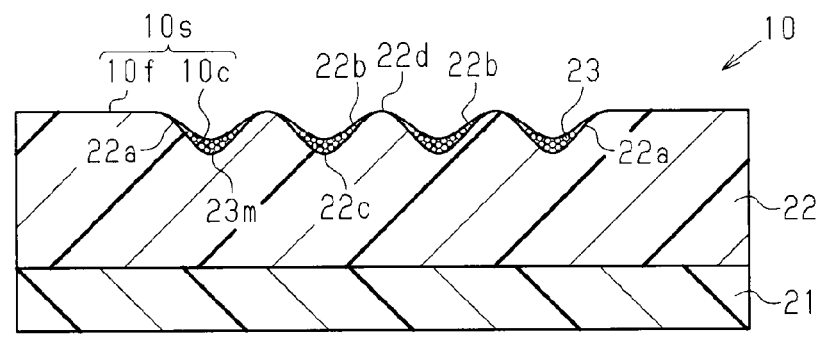
FIG. 16 is a cross-sectional view illustrating a structure according to a modification of the optical element.

As shown in FIG. 16, the uneven surface 10c may have a sinusoidal wave-shaped cross-section in the thickness direction of the conversion layer 22. Namely, each concavity 22a of the uneven surface 10c may have a curvature in the bottom portion 22c, and each convexity 22b may have a curvature in the top portion 22d.

With this configuration, the following advantageous effects are obtained.

(6) The conversion layer 22 is formed by, for example, pressing the original plate having a pattern for forming an uneven surface and a flat surface against the resin layer before being cured, and curing the resin layer, with the original plate being pressed against the resin layer. In this regard, if the shape of the cross-section in the thickness direction of the conversion layer 22 is sinusoidal, the concavities 22a each having a curvature in the bottom portion 22c, and the convexities 22b each having a curvature in the top portion 22d can provide smooth change of shape in the uneven surface 10c. Therefore, the shape of the original plate is easily transferred to the resin layer with good accuracy.

Figure 17:
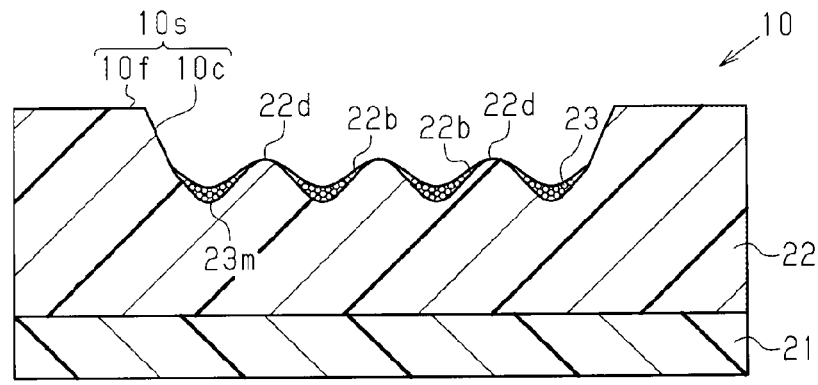
FIG. 17 is a cross-sectional view illustrating a structure according to a modification of the optical element.

As shown in FIG. 17, in the configuration described referring to FIG. 16, the plurality of convexities 22b may be located at a lower level than the flat surface 10f in the thickness direction of the conversion layer 22. Namely, the top portions 22d of the convexities 22b may be located at a lower level than the flat surface 10f in the thickness direction of the conversion layer 22. With this configuration, advantageous effects equivalent to the abovementioned items (4) and (6) can be obtained.

Figure 18:
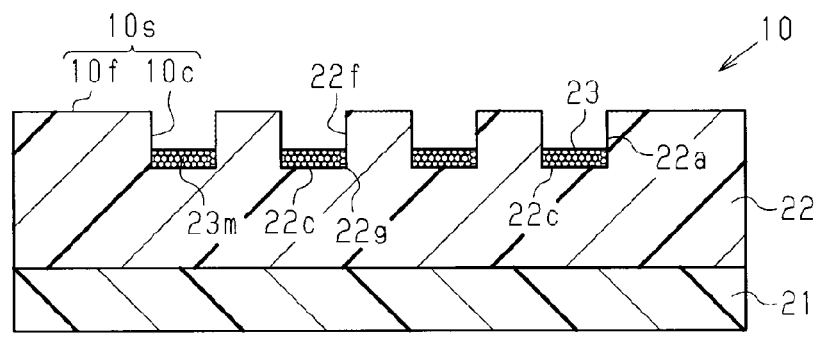
FIG. 18 is a cross-sectional view illustrating a structure according to a modification of the optical element.

As shown in FIG. 18, the uneven surface 10c may have a rectangular wave-shaped cross section in the thickness direction of the conversion layer 22. Namely, in each convexity 22a, the bottom portion 22c may be formed of a flat surface, and a corner portion 22g formed between the bottom portion 22c and a side portion 22f connected to the bottom portion 22c may be substantially at right angle.

With this configuration, the following advantageous effects can be obtained.

(7) Since the bottom portion 22c of each concavity 22a is flat, the metal piece layer 23 easily adheres to the bottom portion 22c. Further, the metal piece layer 23 adhered to the corner portion 22g is resistant to being peeled off from the concavity 22a compared to the configuration in which the corner portion 22g has a curvature.

Figure 19:
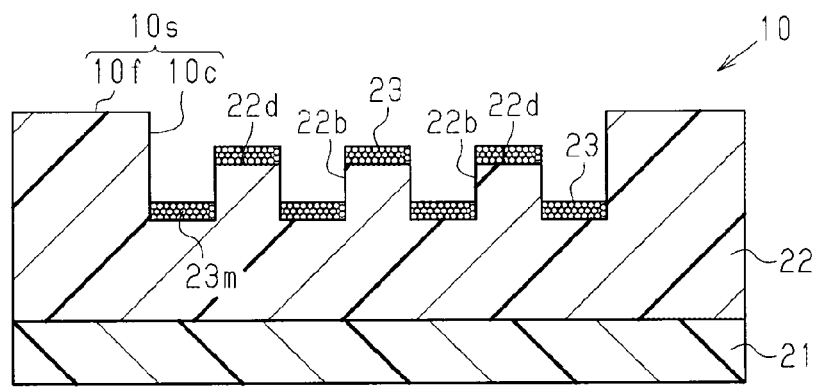
FIG. 19 is a cross-sectional view illustrating a structure according to a modification of the optical element.

As shown in FIG. 19, in the configuration described referring to FIG. 18, the plurality of convexities 22b may be located at a lower level than the flat surface 10f in the thickness direction of the conversion layer 22. Namely, the top portions 22d of the convexities 22b may be located at a lower level than the flat surface 10f in the thickness direction of the conversion layer 22. Such a configuration can obtain advantageous effects equivalent to the abovementioned items (4) and (7).

The cross-sectional shape of the uneven surface 10c in the thickness direction of the conversion layer 22 may include two or more shapes different from each other, from among the shape of the abovementioned embodiments and the shapes described referring to FIGS. 13 to 19.

[Layered Body Structure of the Optical Element]

Figure 20:
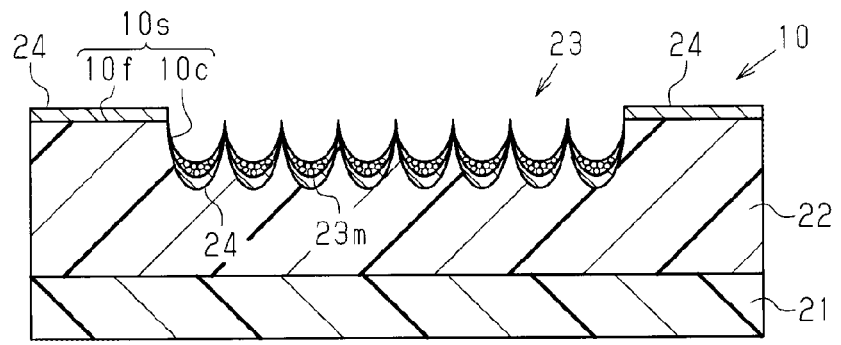
FIG. 20 is a cross-sectional view illustrating a structure according to a modification of the optical element.
Figure 21:
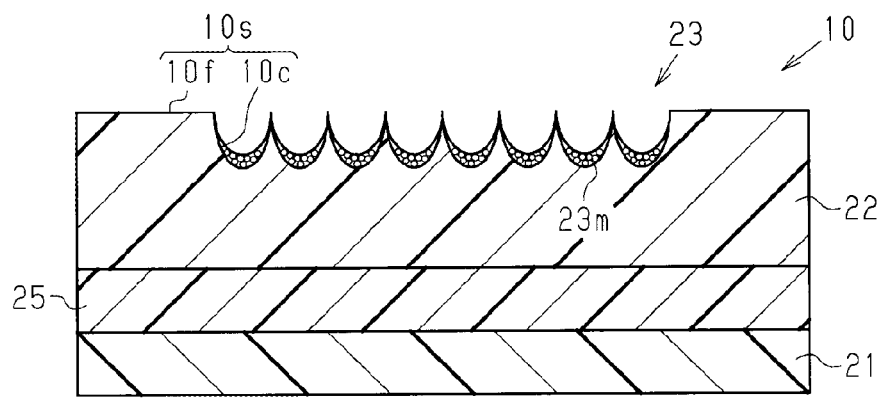
FIG. 21 is a cross-sectional view illustrating a structure according to a modification of the optical element.
Figure 22:
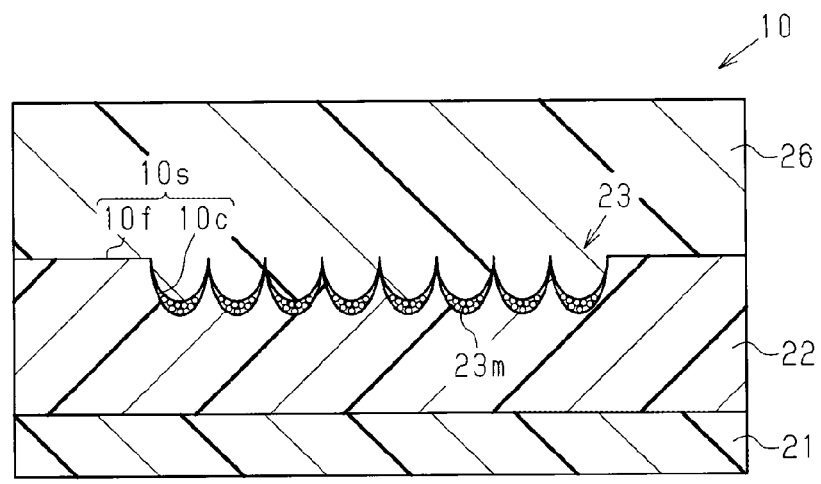
FIG. 22 is a cross-sectional view illustrating a structure according to a modification of the optical element.

Referring to FIGS. 20 to 22, a layered body structure of the optical element 10 in a modification will be described. In FIGS. 20 to 22, the components common to those of the abovementioned embodiments are given the same reference signs to omit description of the configuration.

As shown in FIG. 20, the optical element 10 may be provided with an adjustment layer 24 positioned between the uneven surface 10c and the metal piece layer 23 of the conversion layer 22. The adjustment layer 24 adjusts the adhesive force between the conversion layer 22 and the metal piece layer 23, and facilitates removal of the metal piece layer 23 formed on the flat surface 10f from the conversion layer 22 when a shearing-direction force F is applied to the flat surface 10f. In addition to adjustment of the adhesive force, the adjustment layer 24 may serve as a reflective layer having optical transparency.

When producing the optical element 10, the adjustment layer 24 is formed on the entirety of a surface of the conversion layer 22, that is, on the entirety of the surface having the flat surface 10f and the uneven surface 10c. Also, the metal piece layer 23 is formed on a surface of the adjustment layer 24 on a side opposite to the surface contacting the conversion layer 22. Then, the shearing-direction force F is applied to the metal piece layer 23 located on the flat surface 10f.

The adhesive force between the adjustment layer 24 and the metal piece layer 23 is smaller than the adhesive force between the conversion layer 22 and the adjustment layer 24, and smaller than the adhesive force between the conversion layer 22 and the metal piece layer 23. Therefore, the metal piece layer 23 located on the flat surface 10f is removed from the adjustment layer 24, but the adjustment layer 24 located on the flat surface 10f is not removed from the conversion layer 22. In this case, the metal piece layer 23 located on the flat surface 10f is easily removed from the conversion layer 22 compared to the configuration in which the metal piece layer 23 is directly formed on the flat surface 10f.

The adhesive force between the conversion layer 22 and the adjustment layer 24 may be made smaller than the adhesive force between the adjustment layer 24 and the metal piece layer 23 and made smaller than the adhesive force between the conversion layer 22 and the metal piece layer 23. In such a configuration, the metal piece layer 23 located on the flat surface 10f is removed from the conversion layer 22 together with the adjustment layer 24.

Examples of the material forming the adjustment layer 24 include ceramics and organic polymers, and thus may be a material, as mentioned below, having optical transparency. The numeric value in the parenthesis following the chemical formula or the compound name indicates refractive index n of each material.

When the material used for forming the adjustment layer 24 is ceramics, the material may be any of sulfides, chlorides, oxides, or fluorides. Of these materials, sulfides have a relatively high refractive index, and fluorides have a relatively low refractive index. Since oxides include materials having relatively high to low refractive indexes, when selecting an oxide as a material for forming the adjustment layer 24, the refractive index of the adjustment layer 24 can be selected from a broad range of refractive indexes.

Examples of sulfides include CdS (2.6) and ZnS (2.3), and examples of chlorides include $PbCl_2$ (2.3). Examples of oxides include $Sb_2O_3$ (2.0), $Fe_2O_3$ (2.7), $TiO_2$ (2.6), $CeO_2$ (2.3), CdO (2.2), $WO_3$ (2.0), SiO (2.0), $Si_2O_3$ (2.5), $In_2O_3$ (2.0), PbO (2.6), $Ta_2O_3$ (2.4), ZnO (2.1), $ZrO_2$(2.0), MgO (1.6), $SiO_2$ (1.45), $Si_2O_2$ (2.0), $Al_2O_3$ (1.6), and GaO (1.7). Examples of fluorides include $MgF_2$ (1.4), $CeF_3$ (1), $CaF_2$ (from 1.3 to 1.4), and $AlF_3$ (1.6).

When the material used for forming the adjustment layer 24 is an organic polymer, examples of the material include polyethylene (1.51), polypropylene (1.49), polytetrafluoroethylene (1.35), polymethyl methacrylate (1.49), and polystyrene (1.60).

The configuration described referring to FIG. 20 may be combined with the configuration of each of the modifications of cross-sectional shape of the uneven surface 10c. Namely, in the optical element 10 including the support layer 21, the conversion layer 22, the adjustment layer 24, and the metal piece layer 23, the cross-sectional shape of the uneven surface 10c of the conversion layer 22 in the thickness direction of the conversion layer 22 may be any of the shapes of the abovementioned modifications.

Instead of forming the adjustment layer 24 between the conversion layer 22 and the metal piece layer 23 as shown in FIG. 20, the adhesive force between the conversion layer 22 and the metal piece layer 23 may be adjusted by permitting the conversion layer 22 to contain a fluorine resin or a silicone resin. Alternatively, the optical element 10 may include the adjustment layer 24, and the material for forming the conversion layer 22 may contain the fluorine resin or the silicone resin.

As shown in FIG. 21, the optical element 10 may include another layer positioned between the support layer 21 and the conversion layer 22. For example, when the optical element 10 is a transfer foil, the optical element 10 may include a release layer 25 between the support layer 21 and the conversion layer 22. Thus, in the optical element 10, the conversion layer 22 can be separated from the support layer 21, together with the release layer 25.

The configuration described referring to FIG. 21 may be combined with the configuration of each of the modifications of the cross-sectional shapes of the uneven surface 10c. Namely, in the optical element 10 including the support layer 21, the release layer 25, the conversion layer 22, and the metal piece layer 23, the cross-sectional shape of the uneven surface 10c of the conversion layer 22 in the thickness direction of the conversion layer 22 may be any of the shapes of the abovementioned modifications.

The configuration described referring to FIG. 21 may be combined with the configuration described referring to FIG. 20. Namely, the optical element 10 may be configured to include the support layer 21, the release layer 25, the conversion layer 22, the adjustment layer 24, and the metal piece layer 23.

As shown in FIG. 22, the optical element 10 may include an adhesive layer 26 for covering a surface of the conversion layer 22 on a side opposite to the surface contacting the support layer 21. The adhesive layer 26 serves as a layer for bonding the optical element 10 to an article.

The adhesive layer 26 may be made of an adhesive containing, for example, a polyester resin, a urethane resin, an acrylic resin, a vinyl chloride resin, and the like as main components. The adhesive for forming the adhesive layer 26 may have addition of an adhesion imparting agent, a filler, a softener, a heat/light stabilizer, an antioxidant, or the like.

Examples of the adhesion imparting agent include a rosin resin, a terpene phenol resin, a terpene resin, an aromatic hydrocarbon-modified terpene resin, a petroleum resin, a coumarone-indene resin, a styrene resin, a phenol resin, and a xylene resin. Examples of the filler include a zinc oxide, a titanium oxide, silica, calcium carbonate, and barium sulfate. Examples of the softener include a process oil, a liquid rubber, and a plasticizer. Examples of the heat/light stabilizer include benzophenone-, benzotriazole-, and hindered amine-based heat/light stabilizers. Examples of the antioxidant include anilide-, phenol-, phosphite-, and thioester-based antioxidants.

For example, the adhesive layer 26 is formed using the following method. Namely, an adhesive is applied onto a release member beforehand using a coating machine, such as a roll coater, a knife coater, a roll knife coater, an air knife coater, a die coater, a bar coater, a gravure coater, or a curtain coater. Then, the adhesive, after being dried, is bonded to a surface of the conversion layer 22 having the flat surface 10f and the uneven surface 10c, followed by detaching the release member from the adhesive, thereby forming the adhesive layer 26 for covering the conversion layer 22. The thickness of the adhesive layer 26 is preferably, for example, in the range of 1 µm or more to 300 µm or less, and more preferably, 5 µm or more to 100 µm or less.

In the optical element 10, the front surface may be a surface of the adhesive layer 26 on a side opposite to the surface contacting the conversion layer 22, and the back surface may be a surface of the support layer 21 on a side opposite to the surface contacting the conversion layer 22. In such a configuration, the adhesive layer 26 may have optical transparency, and the article may have at least a portion having optical transparency to which the optical element 10 is bonded. In such a configuration, the surface of the conversion layer 22 having the flat surface 10f and the uneven surface 10c serves as the incident surface 10s.

In the optical element 10, the back surface may be a surface of the adhesive layer 26 on a side opposite to the surface contacting the conversion layer 22, and the front surface may be a surface of the support layer 21 on a side opposite to the surface contacting the conversion layer 22. In such a configuration, the support layer 21 and the conversion layer 22 may at least have optical transparency.

The configuration described referring to FIG. 22 may be combined with the configuration of each of the modifications of the cross-sectional shapes of the uneven surface 10c. Namely, in the optical element 10 including the support layer 21, the conversion layer 22, metal piece layer 23, and the adhesive layer 26, the uneven surface 10c of the conversion layer 22 in the thickness direction of the conversion layer 22 may have a cross-sectional shape in any of the shapes of the abovementioned modifications.

The configuration described referring to FIG. 22 may be combined with the configuration described referring to FIG. 20. Namely, the optical element 10 may include the support layer 21, the conversion layer 22, the adjustment layer 24, the metal piece layer 23, and the adhesive layer 26.

The configuration described referring to FIG. 22 may be combined with the configuration described referring to FIG. 21. Namely, the optical element 10 may include the support layer 21, the release layer 25, the conversion layer 22, the metal piece layer 23, and the adhesive layer 26.

The configuration described referring to FIG. 20, the configuration described referring to FIG. 21, and the configuration described referring to FIG. 22 may be combined. Namely, the optical element 10 may include the support layer 21, the release layer 25, the conversion layer 22, the adjustment layer 24, the metal piece layer 23, and, the adhesive layer 26.

The optical element 10 may be provided with the adhesive layer for covering a surface of the support layer 21 on a side opposite to the surface contacting the conversion layer 22.

[Other modifications]

The article is not limited to the abovementioned card, but may be, for example, valuable securities, brand-name products, and certificates.

In the uneven surface 10c, the height difference H in the thickness direction of the conversion layer 22 may be smaller than 0.1 µm, or may be greater than 0.5 µm. With this configuration, if the uneven surface 10c is covered with the metal piece layer 23 formed of a plurality of metal pieces 23m, advantageous effects according to the abovementioned item (1) can be obtained.

The concavo-convex pitch P may be smaller than 0.2 µm, or may be greater than 5 µm. With this configuration, the uneven surface 10c may at least output incident light as light of a different state than the incident light.

The metal piece pitch may be smaller than 0.01 µm, or may be greater than 0.1 µm. With this configuration, as long as the uneven surface 10c is covered with the metal piece layer 23 formed of a plurality of metal pieces 23m, advantageous effects according to the abovementioned (1) can be obtained.

The diameter of each metal piece 23m may be smaller than 0.02 µm, or may be greater than 0.5 µm. With this configuration, as long as the uneven surface 10c is covered with the metal piece layer 23 formed of a plurality of metal pieces 23m, advantageous effects according to the abovementioned (1) can be obtained.

The flat surface 10f may be omitted from the conversion layer 22. With this configuration, as long as the uneven surface 10c is covered with the metal piece layer 23 formed of a plurality of metal pieces 23m, advantageous effects according to the abovementioned (1) can be obtained.

The optical element 10 may be configured to receive light incident on the uneven surface 10c and output the light to a side opposite to the light incidence side, with respect to the uneven surface 10c. With this configuration, the metal piece layer 23 may at least serve as a semitransparent layer.

For example, in the optical element 10, when the front surface is a surface of the conversion layer 22 on a side opposite to the surface contacting the support layer 21, and, the back surface is a surface of the support layer 21 on a side opposite to the surface contacting the conversion layer 22, the uneven surface 10c outputs light incident on the back surface of the conversion layer 22 toward the front surface as light in a different state than the incident light. With this configuration, the support layer 21 and the conversion layer 22 are both required to have optical transparency.

Further, in the optical element 10, the front surface may be a surface of the support layer 21 on a side opposite to the surface contacting the conversion layer 22, and the back surface may be a surface of the conversion layer 22 on a side opposite to the surface contacting the support layer 21. With this configuration, the support layer 21 and the conversion layer 22 are both required to have optical transparency.

In the method of producing the optical element 10, the following treatments may be performed for the purpose of increasing adhesion between the support layer 21 and the conversion layer 22, and adhesion between the conversion layer 22 and the metal piece layer 23. Namely, at least one of corona treatment, plasma treatment, and primer coating may be given to the surface of the support layer 21 contacting the conversion layer 22, and the surface of the conversion layer 22 contacting the metal piece layer 23.

At least one of the support layer 21 and the conversion layers 22 of the optical element 10 may be colored with a predetermined color. However, the layer through which the light outputted from the uneven surface 10c passes, before being outputted to the outside of the optical element 10, is required to have optical transparency.

The optical element 10 may be provided with an inlet configured by an IC chip and an antenna.

The optical element 10 may serve as an optical element used for the purpose of preventing counterfeiting of various types of articles, or may serve as an optical element used for the purpose of decorating articles, or may serve as an optical element used for the purpose of increasing the aesthetic appearance of articles. The optical element 10 may itself be an object of appreciation.

REFERENCE SIGNS LIST

10 . . . Optical element, 10c . . . Uneven surface, 10f . . . Flat surface, 10s . . . Incident surface, 21 . . . Support layer, 22 . . . Conversion layer, 22a . . . Concavities, 22b . . . Convexities, 22c . . . Bottom portion, 22d . . . Top portion, 22e . . . Arc surface, 22f . . . Side portion, 22g . . . Corner portion, 23 . . . Metal piece layer, 23m . . . Metal piece, 24 . . . Adjustment layer, 25 . . . Release layer, 26 . . . Adhesive layer, 31 . . . Removal roller, 32,34 . . . Conveyance roller, 33 . . . Removal squeegee, 35 . . . Cleaning tank, 40 . . . Card, 41 . . . Material, L . . . Cleaning liquid.

What is claimed is:

1. An optical element comprising:
   a conversion layer provided with a light-incidence surface including an uneven surface portion, the conversion layer being configured to receive light that is incident on the uneven surface and output the light from the uneven surface portion as light in a different state than the incident light; and
   a metal piece layer configured by a plurality of metal pieces to cover at least part of the uneven surface portion, wherein:
   the light-incidence surface further includes a flat surface portion which is flatter than the uneven surface portion;
   the uneven surface portion includes a plurality of concavities;
   each concavity of said plurality of concavities has a top portion and a bottom portion, which is further from the flat surface portion in a thickness direction of the conversion later than the top portion; and
   a thickness of the metal layer in the bottom portion of the concavity is larger than a thickness of the metal layer in the top portion of the concavity.

2. The optical element of claim 1, wherein:
   the uneven surface portion further includes a plurality of convexities, each of which is defined to two adjacent concavities of said plurality; and
   at least part of the plurality of convexities is located at a lower level than the flat surface portion in the thickness direction of the conversion layer.

3. The optical element of claim 2, wherein in the plurality of metal pieces, the distance between the metal pieces adjacent to each other is within the range of 0.01 µm or more to 0.1 µm or less.

4. The optical element of claim 1, wherein
   the plurality of concavities are each configured by two arc surfaces which are connected to each other in the bottom portion and face each other, the two arc surfaces each having a curvature of forming an outward projection in the conversion layer from the uneven surface portion.

5. The optical element of claim 1, wherein:
   the top portion has a curvature larger than a curvature in the bottom portion, in at least part of the plurality of concavities.

6. The optical element of claim 1, wherein:
   the bottom portion has a curvature greater than a curvature in the top portion, in at least part of the plurality of concavities.

7. The optical element of claim 1, wherein the uneven surface portion includes a portion having a sinusoidal wave-shaped cross section in the thickness direction of the conversion layer.

8. The optical element of claim 1, wherein:
   the uneven surface portion includes the plurality of concavities and a plurality of convexities;
   the concavities and the convexities are alternately and consecutively arrayed, and the uneven surface portion has a height difference in a range of 0.1 µm or more to 0.5 µm or less in the thickness direction of the conversion layer;

concavities each have a bottom portion which is a most recessed portion in the thickness direction of the conversion layer;

two of the bottom portions have a distance therebetween in a range of 0.2 µm or more to 5 µm or less, the two of the bottom portions being adjacent to each other in an array direction of the concavities and the convexities;

the metal pieces each have a form of a particle;

the metal pieces adjacent to each other have a distance therebetween in a range of 0.01 µm or more to 0.1 µm or less; and the metal pieces each have a diameter in a range of 0.02 µm or more to 0.5 µm or less.

9. An article provided with an optical element, wherein the optical element is the optical element of claim 1.

10. The optical element of claim 1, wherein in the plurality of metal pieces, the distance between the metal pieces adjacent to each other is within the range of 0.01 µm or more to 0.1 µm or less.

11. The optical element of claim 1, wherein the light-incident surface is a front surface observed by an observer.

12. The optical element of claim 1, wherein the optical element further includes a support layer and that the light-incident surface is a surface, which is opposite to the surface of the conversion layer contacting the support layer.

13. The optical element of claim 1, wherein the conversion layer comprises a thermoplastic resin, a thermosetting resin or an ion radiation curable resin.

14. The optical element of claim 1, wherein a thickness of the conversion layer is in a range of 0.2 µm or more to 10 µm or less.

15. A method of producing an optical element comprising:
    forming a conversion layer provided with a light-incidence surface that includes an uneven surface portion and a flat surface portion flatter than the uneven surface portion, the light-incidence surface receiving light incident on the uneven surface portion and outputting the light from the uneven surface portion as light in a different state than the incident light;
    forming a metal piece layer configured by a plurality of metal pieces in at least part of the uneven surface portion and in at least part of the flat surface portion; and
    transferring at least part of the metal piece layer formed on the flat surface portion to the uneven surface portion, by applying a force to the metal piece layer formed on the flat surface portion, the force being applied in a shearing-direction relative to the metal piece layer, wherein:

the uneven surface portion includes a plurality of concavities;

each concavity of said plurality of concavities has an opening portion and a bottom portion, which is further from the flat surface portion in a thickness direction of the conversion later than the top portion; and a thickness of the metal layer in the bottom portion of the concavity is larger than a thickness of the metal layer in the top portion of the concavity.

16. A method of producing an optical element of claim 15, wherein:
    the optical element be provided with an adjustment layer positioned between the uneven surface portion and the metal piece layer of the conversion layer.

17. A method of producing an optical element of claim 15, wherein:
    the uneven surface portion includes a portion including a plurality of concavities extended in one direction and another portion including a plurality of concavities extending in another direction.

* * * * *